(12) United States Patent
Kamiya

(10) Patent No.: US 11,865,706 B2
(45) Date of Patent: Jan. 9, 2024

(54) ROBOT

(71) Applicant: DAILY COLOR INC., Tokyo (JP)

(72) Inventor: Yasunori Kamiya, Tokyo (JP)

(73) Assignee: DAILY COLOR INC., Tokyo (JP)

( * ) Notice: Subject to any disclaimer, the term of this patent is extended or adjusted under 35 U.S.C. 154(b) by 0 days.

(21) Appl. No.: 18/012,061

(22) PCT Filed: Jul. 2, 2021

(86) PCT No.: PCT/JP2021/025123
§ 371 (c)(1),
(2) Date: Dec. 21, 2022

(87) PCT Pub. No.: WO2022/004875
PCT Pub. Date: Jan. 6, 2022

(65) Prior Publication Data
US 2023/0191588 A1    Jun. 22, 2023

(30) Foreign Application Priority Data

Jul. 3, 2020  (JP) ................................. 2020-116000
Sep. 15, 2020  (JP) ................................. 2020-154944

(51) Int. Cl.
*B25J 9/16* (2006.01)
*B25J 13/08* (2006.01)
(Continued)

(52) U.S. Cl.
CPC ............... *B25J 5/00* (2013.01); *B25J 9/1664* (2013.01); *B25J 13/08* (2013.01); *B25J 15/08* (2013.01)

(58) Field of Classification Search
CPC ... B25J 5/00; B25J 9/1664; B25J 13/08; B25J 15/08
See application file for complete search history.

(56) References Cited

U.S. PATENT DOCUMENTS

2015/0360865 A1  12/2015  Massey
2016/0059411 A1*  3/2016  Richter ................ G05D 1/0236
                                             901/1
(Continued)

FOREIGN PATENT DOCUMENTS

JP          7-308877        11/1995
JP          2012-56661       3/2012
(Continued)

OTHER PUBLICATIONS

International Search Report (ISR) dated Sep. 7, 2021 in International (PCT) Application No. PCT/JP2021/025123.
(Continued)

*Primary Examiner* — Harry Y Oh
(74) *Attorney, Agent, or Firm* — Wenderoth, Lind & Ponack, L.L.P.

(57) ABSTRACT

A robot includes: a moving mechanism; an elevating mechanism including columnar members; a table which is configured to be elevated and lowered by the elevating mechanism; an arm base which is configured to be elevated and lowered by the elevating mechanism; an arm which is attached to the arm base; a sensor which is configured to detect an object placed on the table and the surrounding area of the robot; and a controller. A circumscribed space circumscribing the robot except for the arm is in the shape of a cuboid having a bottom face that is a face of a quadrilateral that circumscribes, in a top view, the shape of the robot except for the arm. The arm has a structure capable of accessing the outside of the circumscribed space.

4 Claims, 7 Drawing Sheets

(51) Int. Cl.
*B25J 15/08* (2006.01)
*B25J 5/00* (2006.01)

(56) References Cited

U.S. PATENT DOCUMENTS

| | | | |
|---|---|---|---|
| 2016/0304281 A1* | 10/2016 | Elazary | ............... B25J 15/06 |
| 2018/0065806 A1 | 3/2018 | Sugahara et al. | |
| 2020/0078939 A1* | 3/2020 | Jeong | ............... B25J 9/1697 |

FOREIGN PATENT DOCUMENTS

| | | |
|---|---|---|
| JP | 2015-178141 | 10/2015 |
| JP | 6137005 | 5/2017 |
| JP | 2018-15885 | 2/2018 |
| JP | 2018-39668 | 3/2018 |
| WO | 2016/181480 | 11/2016 |
| WO | 2016/181801 | 11/2016 |

OTHER PUBLICATIONS

Written Opinion of the International Searching Report Authority dated Sep. 7, 2021 in International (PCT) Application No. PCT/JP2021/025123 (with English translation).
Extended European Search Report dated Nov. 6, 2023 in European Patent Application No. 21834595.7.

\* cited by examiner

ROBOT

TECHNICAL FIELD

The present disclosure relates to robots, and in particular to robots capable of entering environments in which people are active and taking over various manual tasks.

BACKGROUND ART

A transport robot capable of transporting packages placed on shelves has been proposed (see Japanese Patent No. 6137005). This transport robot can transport packages placed on shelves at any height.

SUMMARY OF INVENTION

Technical Problem

However, with the technique of JP 6137005, (1) although the transfer robot is anticipated to be used in environments such as factories and warehouses (paragraphs [0002] through [0005] of JP 6137005), these are environments designed with the use of the robot in mind; the robot is not suitable for applications in which the robot is introduced into existing environments originally designed for human activity, such as residences and other various facilities in which people are active, and (2) the technique is applicable to transporting goods and is not suitable for applications in which the robot takes over various manual tasks.

In view of this, the present disclosure has an object to provide a robot that can enter environments in which people are active and take over various manual tasks.

Solution to Problem

In order to achieve the above-described object, in one aspect, a robot includes: a moving mechanism capable of moving autonomously; an elevating mechanism including a columnar member erected on the moving mechanism; a table which is elevated and lowered by the elevating mechanism; an arm base which is provided above the table and is elevated and lowered by the elevating mechanism; an arm which is attached to the arm base and includes a hand capable of accessing an object placed on the table; a sensor which detects the object and the surrounding area of the robot; and a controller that controls the moving mechanism, the elevating mechanism, and the arm based on information obtained from an external source and the detection result of the sensor. A circumscribed space circumscribing the robot except for the arm is in a shape of a cuboid having a bottom face that is a face of a quadrilateral that circumscribes, in a top view, a shape of the robot except for the arm. The arm has a structure capable of accessing an outside of the circumscribed space. Length A of a first of two orthogonal sides of the bottom face is 110 cm or less. Length B of the second of the two orthogonal sides is 110 cm or less, independent of A. Height H of the circumscribed space is 1.5A or more.

Advantageous Effects of Invention

The present invention provides a robot that can enter environments in which people are active and take over various manual tasks.

DESCRIPTION OF EMBODIMENTS

Knowledge Obtained by the Inventor

Figure 1:
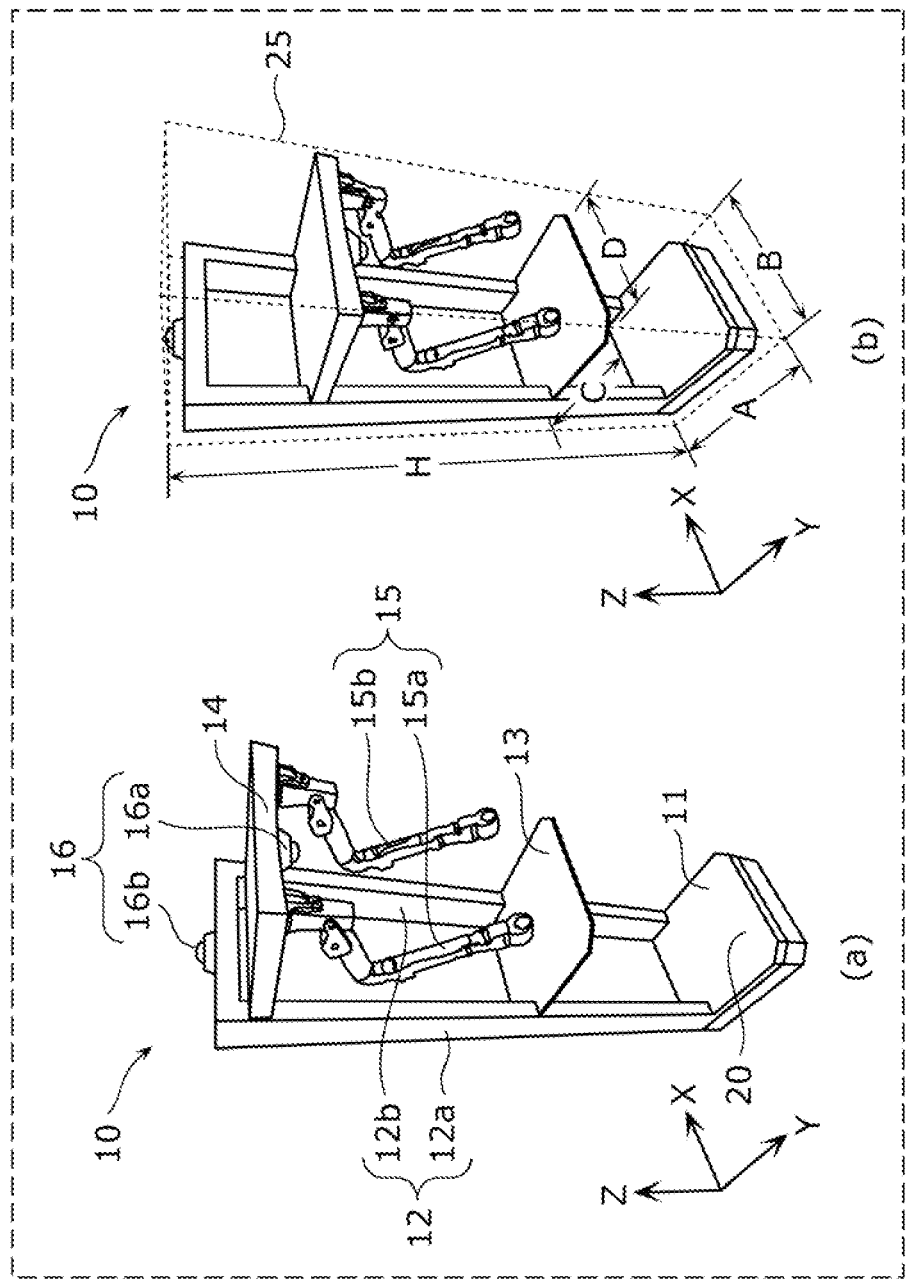
FIG. 1 is an external perspective view of a robot according to an embodiment.

The inventor has come to recognize that the following eight issues and requirements need to be overcome and satisfied when it comes to successfully carrying out tasks and realizing functions when aiming to realize a robot that can enter environments in which people are active and take over various manual tasks.

(1) The robot must have a footprint approximately equal to or less than that of a person.

Large robots are unusable because they cannot enter an environment in which people are active. Considering the fact that the footprint (the area occupied in a view from vertically above) of a person performing a task may widen depending on the posture taken, such as squatting, and considering people with various body types from various countries, the footprint is typically an area of 110 cm×110 cm at most. Therefore, a robot that is to enter an environment in which people are active and take over a manual task must have a footprint approximately equal to or less than that of a person to be able to perform tasks in the environment.

Even if they were vertically elongated, robots currently in practical use for taking over manual tasks would have a very large footprint compared to a person, and therefore have not been able to replace people in performing manual tasks, or have only been considered as usable for performing tasks in large areas. In other words, although robots that aim to replace people in performing manual tasks have been proposed as prototypes, the reality is that when they are placed in an environment in which people are active for the purpose of taking over manual tasks, conventional robots can only perform a very limited portion of the tasks, and are far from achieving their goal.

(2) The robot must be able to handle task-related objects.

A task typically involves one or more objects that are related to the task and handled by the robot, such as an object to be worked on in the task or a tool necessary for the task (hereinafter such objects are referred to as task-related objects). Conversely, the only tasks for which task-related objects do not exist are those in which the fingers, hands, and arms change posture for others to see, such as hand games, sign language, and dancing. Various other remaining tasks, almost all of which—99% or more—involve task-related objects.

It can therefore be said a robot that is to enter an environment in which people are active and take over a manual task needs to be able to handle task-related objects. Note that task-related objects are often attached to the robot and moved. This includes the movement of objects to be worked on in the task to and from various task and storage locations, and the movement of tools necessary for the task between storage and task locations.

(3) Tasks need to be completed in as little time as possible.

In order to realize a robot for replacing a person, it is key that the overall cost of using the robot be lower than if the task were performed by a person. Otherwise there would be no point in replacing the person. One element of overall cost is task time. In other words, a reduction in task time is one key requirement.

(4) The robot must be able to perform a desired task in an area outside a circumscribed space that houses the robot body (the body excluding the arm(s)).

Since manual tasks performed in environments in which people are active differ in various ways, it is not possible to anticipate target task locations when designing the robot. Therefore, when the robot body is brought as close to the limit as possible to the task location, some part of the robot body will come into contact with some object in the robot's surrounding environment in an unforeseen posture. In other words, when designing a robot, it is difficult to anticipate what will hit where on the robot body under what circumstances. The robot must therefore be able to perform a desired task with a robot arm accessing the space outside the circumscribed space that houses the robot body (the circumscribed space can be said to be the space where the robot may bump into objects in the surrounding environment; for robots that are primarily designed to perform tasks close to the robot body, this requirement is difficult to meet).

(5) Various tasks/actions need to be able to be performed by a single robot.

Reason 1: When considering replacing a human with a robot, it does not make much sense for the object to be worked on in the task to be a single type of object. This is because if the object to be worked on in the task is a single type of object, it is likely that the task is already being performed by a dedicated machine, or it is feasible to perform the task using a high-performance, dedicated machine for that task. Even if there are variations in the object to be worked on in the task, if there is only one task that can be performed, it may be accomplished with a slightly more sophisticated machine.

Reason 2: Also, with such machines, even if there are variations in the object to be worked on in the task, the robot is typically designed in such a way that a number of specific objects that the robot will handle are established in advance in the design phase. One does not specify an object to be handled by the robot by specifying an object by a name with a broad meaning (examples include cup, chair, and screwdriver), such as a general noun or categorical name, which requires a variety of changes in actions when performing tasks. However, a robot that is to enter an environment in which people are active and perform a manual task must also handle objects that require a variety of changes in actions in order to successfully take over tasks performed by humans. For these reasons, a robot that enters an environment in which people are active and takes over a manual task must be able to perform a variety of tasks and actions alone.

(6) Task-related objects need to be placed as close to the task location as possible.

As long as a task-related object is involved in a task, the robot will be required to operate to hold or place the task-related object. In addition, some tasks require re-holding, rearranging, or holding or placing task-related objects a plurality of times. This results in the hand moving back and forth between the task location and the location where the task-related object is placed. In addition, as mentioned above, the robot must be able to complete the task in a short amount of time. For these reasons, a robot that enters an environment in which people are active and takes over a manual task must be able to place task-related objects as close to the task location as possible.

(7) The robot needs to perform the same task at various heights.

With robots that enter an environment in which people are active and take over a manual task, the environment in which the robot performs a task is not determined during robot design. The person being replaced, however, is capable of performing the task even if the environment in which the task is performed is not completely known in advance. As one example of differing environments, imagine a case in which the task location is at different heights. A person is capable of performing a task at various heights, by, for example, standing upright, hunching over, squatting/crouching, and stretching and reaching in the air. Therefore, a robot that enters an environment in which people are active and takes over a manual task must be able to perform the same task at any position from a low position to a high position, and with the same task configuration.

(8) The robot must be able to move and perform a task quickly.

If it takes time and effort to move the robot after a task is completed, the goal of replacing people cannot be achieved. The entire task, including moving, from start to finish, must be completed in a short period of time. This is because, as mentioned above, completing a task in a short amount of time is one of the key requirements for a robot that enters an environment in which people are active and takes over a manual task.

For example, a robot performing a task in one location needs to be able to take an object, move it immediately to another location, and then immediately perform the next task at the new location. In other words, it is not acceptable if the robot is fast at completing each major task but requires time to transition from one major action to another.

Thus, in order to be able to enter an environment in which people are active and take over a manual task, the robot needs to overcome and satisfy the issues and requirements described in (1) through (8) above. Even if one tries to simply combine techniques that have been separately and partially considered to overcome and satisfy each issue and requirement, it cannot be done because of the existence of preconditions (i.e., constraints) in each technique for solving their respective problems (i.e., preconditions for using the technique), or they cannot be combined in the first place because of the structure/content of each technique. It is therefore very difficult and impractical to find a combination of individual techniques that can simultaneously overcome and satisfy as many of the eight issues and requirements as possible and avoid the occurrence of all of them (it is possible to find such a combination when the number of issues/requirements is only a few at most). It is not possible to realize a robot that simultaneously overcomes and satisfies as many of the issues and requirements listed in (1)

through (8) above as possible by simply collecting techniques that are individually conceived to overcome or satisfy an issue or requirement.

Therefore, the inventor has come up with a practical robot that simultaneously overcomes and satisfies as many of the issues and requirements listed in (1) through (8) above as possible from scratch, instead of combining several existing techniques/inventions that individually overcome and satisfy the above issues and requirements of (1) through (8).

Embodiment

Hereinafter exemplary embodiments of the present disclosure will be described in detail with reference to the drawings. The exemplary embodiments described below are specific examples of the present disclosure. The numerical values, shapes, materials, elements, the arrangement and connection of the elements, steps, the order of the steps, etc., in the following exemplary embodiments are mere examples, and therefore are not intended to limit the present disclosure. The figures are not necessarily precise depictions. In the figures, elements that are essentially the same are assigned with the same reference signs, and repeated description thereof may be omitted or simplified.

FIG. 1 is an external perspective view of robot 10 according to an embodiment. FIG. 1 illustrates examples of table 13 and arm base 14 included in robot 10 at two different heights ((a) and (b) in FIG. 1). For convenience, the reference signs of the finer elements are illustrated in (a) in FIG. 1, and the reference signs of circumscribed space 25 and the dimensions thereof are illustrated in (b) in FIG. 1. As illustrated in FIG. 1, the Y-axis (extending front to back) positively extends in the forward-facing direction of robot 10 when robot 10 corresponds to a two-armed person, the X-axis (extending left to right) is the axis orthogonal to the Y-axis in the horizontal plane, and the Z-axis (extending up and down) is the vertical axis orthogonal to the X- and Y-axes. The three-dimensional space defined by the X-, Y-, and Z-axes is referred to herein as a given three-dimensional space.

Robot 10 according to the present embodiment is a robot that enters an environment in which people are active and takes over a manual task, and includes: moving mechanism 11 capable of moving autonomously; elevating mechanism 12 including columnar members 12a and 12b erected on moving mechanism 11; table 13 which is elevated and lowered along columnar members 12a and 12b by elevating mechanism 12; arm base 14 which is provided above table 13 and is elevated and lowered along columnar members 12a and 12b by elevating mechanism 12; arms 15 (first arm 15a and second arm 15b) which are attached to arm base 14, have five or more degrees of freedom, and are capable of accessing an object placed on table 13; sensors 16 (first camera 16a and second camera 16b) which detect the state on table 13, including an object, and the surrounding area of robot 10; and controller 20 that controls moving mechanism 11, elevating mechanism 12, and arms 15 based on information obtained from an external source and the detection result of sensors 16. Moving mechanism 11, elevating mechanism 12 (an elevating unit for arm base 14 and an elevating unit for table 13), and arms 15 (first arm 15a and second arm 15b) operate independently and in parallel under control by controller 20. The information obtained from an external source includes not only specific or abstract instructions to robot 10, but also general data such as schedules, positions, etc. Examples of a task that robot 10 takes over include serving and clearing food and dishes, making beds, organizing and cleaning rooms, and collecting and maintaining tools.

The cuboid circumscribed space 25 circumscribing robot 10 except for arms 15 is in the shape of a cuboid having a bottom face that is a face of a quadrilateral that circumscribes, in a top view, the shape of robot 10 except for arms 15, and arms 15 have a structure capable of accessing the outside of circumscribed space 25. Length A of a first of two orthogonal sides of the bottom face of the circumscribed space is 110 cm or less, and length B of the second of the two orthogonal sides is 110 cm or less, independent of A. Height H of circumscribed space 25 is 1.5A or more and 350 cm or less. Since height H is 1.5A or more, the robot has a vertically elongated silhouette. Considering that people use step stools and that there are people of various heights from various countries, the height can be considered to be no higher than 350 cm, no matter how tall the person is, and thus height H of circumscribed space 25 is no higher than 350 cm. Furthermore, among two sides of a quadrilateral that circumscribes the shape of table 13 in a top view, the side that is parallel to the first of the two orthogonal sides described above (i.e., the side corresponding to length A) has a length C greater than or equal to 0.5A or 0.5B and less than or equal to A, and the side that is parallel to the second of the two orthogonal sides described above (i.e., the side corresponding to length B) has a length D greater than or equal to 0.5A or 0.5B and less than or equal to B. Table 13 needs to be somewhat wide in order to place several various objects on top of table 13. Table 13 and arm base 14 are connected to elevating mechanism 12, independently of each other, so as to be elevatable and lowerable over a distance of H/5 or more. Among the dimensions described above, the upper limit of H, the lower limits of A and B, the ranges of C and D, and the range over which table 13 and arm base 14 can be elevated and lowered are non-limiting examples.

Next, each element will be described in greater detail.

Moving mechanism 11 is an autonomous moving mechanism that can change its direction of travel under the control of controller 20. For example, it is an opposed two-wheel drive type moving mechanism, and the speed and direction of travel of moving mechanism 11 are adjusted by adjusting the speed of the two opposing independently driven wheels. In the present embodiment, the top view shape of moving mechanism 11 is an approximate 40 cm (A)×40 cm (B) square with the corners cut off.

The top view shape of moving mechanism 11 is not limited to this example, and may be any shape that is no larger than 110 cm×110 cm. Moving mechanism 11 is not limited to the above example. For example, an omnidirectional wheeled moving mechanism, a multi-legged moving mechanism, and a bipedal moving mechanism are conceivable.

Elevating mechanism 12 includes two metal columnar members 12a and 12b erected on moving mechanism 11, and elevates and lowers table 13 and arm base 14 under the control of controller 20. The two columnar members 12a and 12b are fixed to moving mechanism 11 and table 13 at first and second corners, respectively, which correspond to the same corner in top view. In the present embodiment, the two columnar members 12a and 12b are equipped with two independent belt drive mechanisms (not illustrated in the drawings) for independently elevating and lowering table 13 and arm base 14. Columnar members 12a and 12b may include two independent stage drive mechanisms (for example, a first elevating mechanism and a second elevating mechanism) for independently elevating and lowering table 13 and arm base 14. Table 13 and arm base 14 may be elevated and lowered along different columnar members without sharing a columnar member, irrespective of the present embodiment.

In the present embodiment, the section in which table 13 can be elevated and lowered is from its lowest point to a height of 140 cm (7H/8), and the section in which arm base 14 can be elevated and lowered is from its highest point to a height of 20 cm (7H/8). However, the sections are not limited to these; it is sufficient if table 13 and arm base 14 can be elevated and lowered over a distance of H/5 or more.

Table 13 is a metal or plastic shelf that is wide enough to hold (or place), on the table itself, objects to be worked on in the task, a box or tray containing a plurality of such objects, and task-related objects such as tools to be used for the task, and in the present embodiment, has a top view shape of an approximate 40 cm (A)×40 cm (B) square. The top view shape of table 13 is not limited to this example, and may be any other shape, such as a circle or trapezoid, as long as it fits into an A cm×B cm square. Stated differently, it is sufficient if the circumscribed quadrilateral of table 13 has dimensions where the lengths of its two sides C and D satisfy 0.5A or 0.5B≤C≤A, and 0.5A or 0.5B≤D≤B, respectively.

Arm base 14 is a metal or plastic base to which arms 15 are fixed, and in the present embodiment, has a top view shape of an approximate 40 cm×40 cm square. The top view shape of arm base 14 is not limited to this example, and may be any other shape, such as a circle, trapezoid, frame, or beam, as long as it fits into an A cm×B cm quadrilateral.

First arm 15a and second arm 15b are fixed to the bottom face of arm base 14, as if hanging down, and spaced apart by a predetermined distance in the X-axis direction. First arm 15a and second arm 15b are metal or plastic arms with a seven degrees-of-freedom structure similar to a human arm, with a gripping mechanism at the distal end (a structure in which a shoulder joint, an upper arm, an elbow joint, a forearm, a wrist joint, and a gripping mechanism (a hand) are coupled). The number of degrees of freedom that first arm 15a and second arm 15b have is not limited to seven, and may have a number of degrees of freedom that allow for the control of five or more or four or more of the following six variables of movement of the hand in the given three-dimensional space: left-right translation (X-axis translation), vertical translation (Z-axis translation), front-back translation (Y-axis translation), X-axis rotation, Y-axis rotation, and Z-axis rotation. As an example, the robot may be a vertically articulated robot with five or more axes.

Sensors 16 include first camera 16a that detects the state on table 13, including objects to be worked on in the task, second camera 16b that detects the surrounding area of robot 10, and various other sensors (not illustrated in the drawings). Under the control of controller 20, the information detected by sensors 16 is output to controller 20. First camera 16a and second camera 16b are digital cameras that can pan, tilt, and zoom, and are fixed to the bottom face of arm base 14 and the top face of elevating mechanism 12, respectively. The other various sensors include, for example, acceleration sensors and GPS sensors attached to the upper ends of columnar members 12a and 12b, encoders indicating the vertical position of table 13 and arm base 14, sensors that detect the charge capacity of the battery serving as the power source of robot 10 that is built into moving mechanism 11, and temperature sensors.

Controller 20 is a controller that communicates wirelessly with an external terminal device, controls moving mechanism 11 and elevating mechanism 12 using the detection results from sensors 16 according to the information from the terminal device, and outputs the detection results from sensors 16 to the terminal device. The controller includes non-volatile memory that holds the control program, volatile memory that temporarily stores information, a processor that executes the control program, and input/output circuits for connection to various peripheral devices. However, controller 20 can also receive conceptual as well as specific instructions from the outside, and construct actions autonomously and carry out the actions by, for example, looking at the detection results from sensors 16, accessing external databases, etc.

Each element that requires power operates by receiving a supply of power from a rechargeable battery (not illustrated in the drawings) built into moving mechanism 11.

Figure 2:
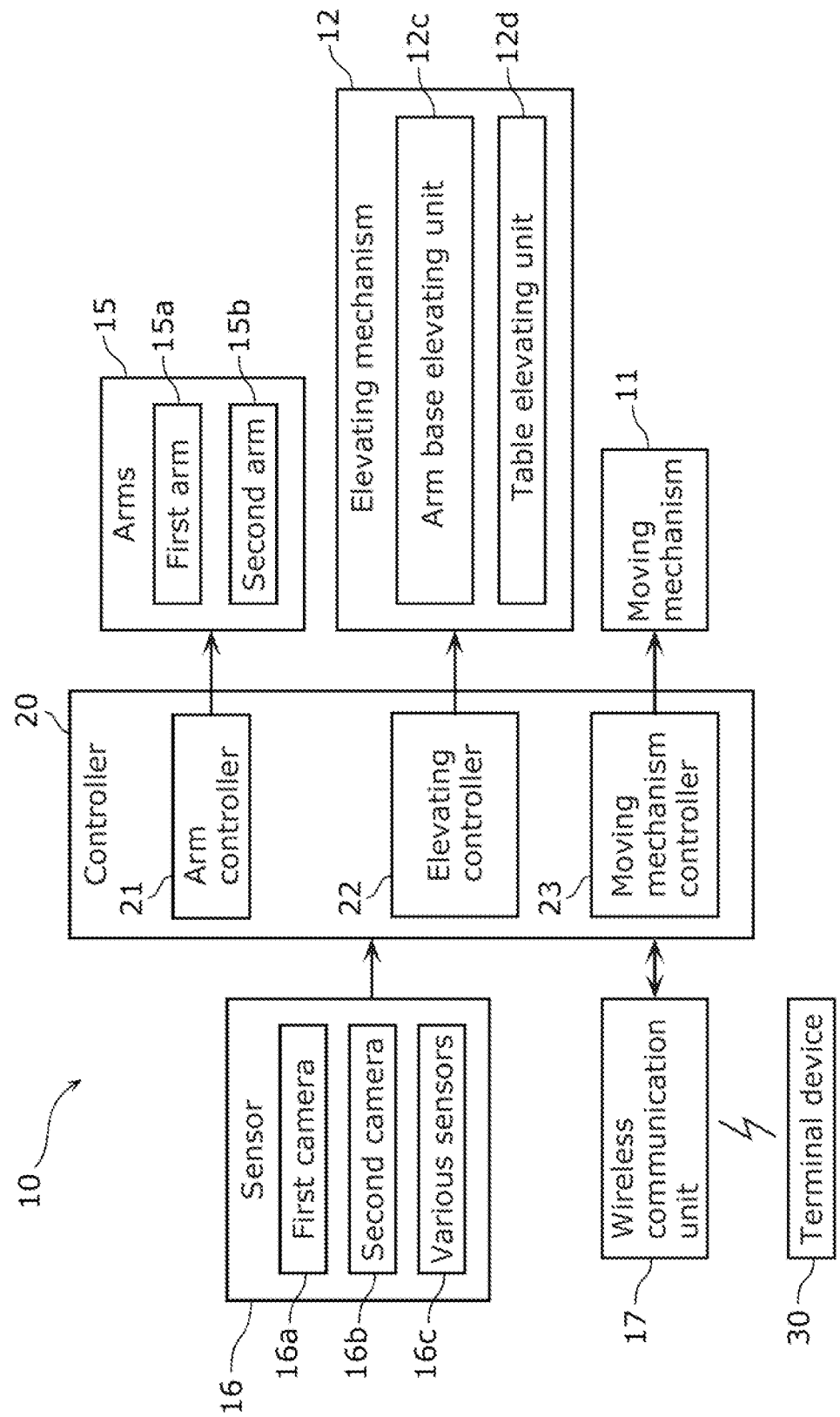
FIG. 2 is a block diagram illustrating the configuration of the robot illustrated in FIG. 1.

FIG. 2 is a block diagram illustrating the configuration of robot illustrated in FIG. 1 (i.e., illustrating the functional configuration centered on controller 20). Terminal device 30 that communicates wirelessly with robot 10 is also illustrated in FIG. 2. Robot 10 includes controller 20, as well as moving mechanism 11, elevating mechanism 12, arms 15, sensors 16 (first camera 16a, second camera 16b, and various sensors 16c), and wireless communication unit 17 that transmit and receive signals to and from controller 20.

Elevating mechanism 12 includes arm base elevating unit 12c that elevates and lowers arm base 14 and table elevating unit 12d that elevates and lowers table 13. Arm base elevating unit 12c and table elevating unit 12d independently elevate and lower arm base 14 and table 13, respectively, as described above.

Wireless communication unit 17 is a communication interface that communicates with terminal device 30 by wireless communication, such as over a wireless LAN.

Functionally, controller 20 includes arm controller 21, elevating controller 22, and moving mechanism controller 23 that perform control based on information from terminal device 30 via wireless communication unit 17 and based on the detection results of sensor 16. Arm controller 21 controls arms 15 (first arm 15a and second arm 15b), elevating controller 22 controls elevating mechanism 12 (arm base elevating unit 12c and table elevating unit 12d), and moving mechanism controller 23 controls moving mechanism 11.

Figure 6:
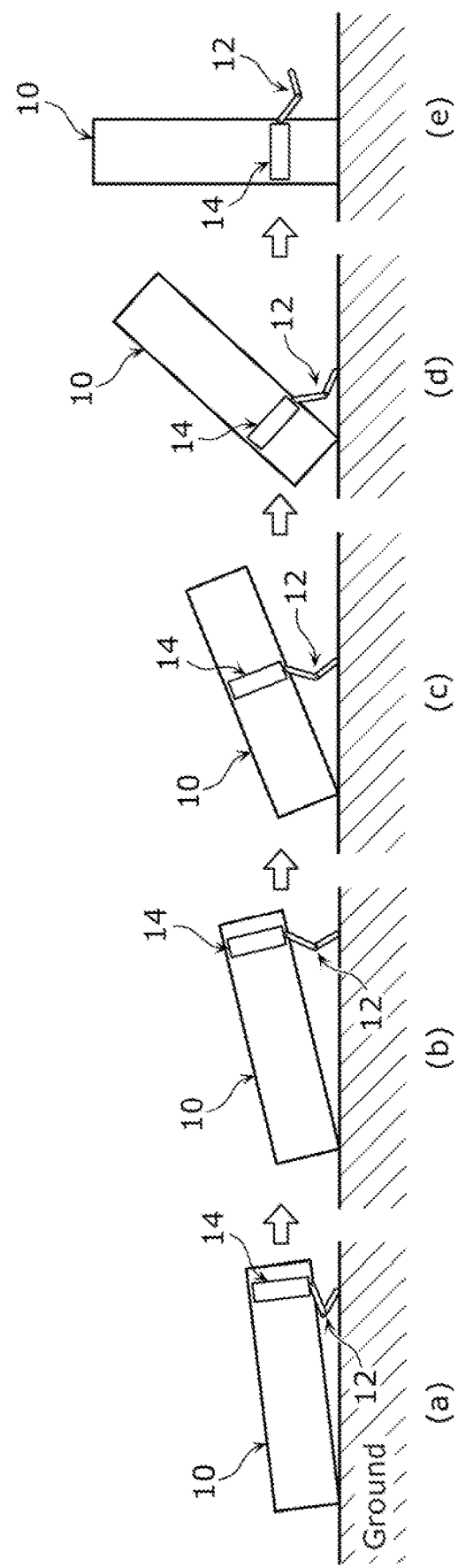
FIG. 6 illustrates an example of an action performed under third control performed by the controller included in the robot according to an embodiment.

Controller 20 performs at least the following three characteristic controls (hereinafter referred to as first, second, and third controls). As the first control, controller 20 controls at least one of the relative height of arm base 14 with respect to table 13, the height of table 13, or the height of arm base 14, in accordance with at least one of the action to be performed by robot 10, the type of object to be handled in the action, the posture of the object to be handled in the action, or the number of objects to be handled in the action. As the second control, controller 20 starts changing the height of at least one of table 13 or arm base 14 after robot 10 starts moving to and before arriving at the task location, in accordance with at least one of the action performed by robot 10, the task location to which robot 10 is to move, the type of object to be handled by robot 10 at the task location, the posture of the object to be handled by robot 10 at the task location, or the number of objects to be handled by robot 10 at the task location. As the third control, as in the action example illustrated in FIG. 6, controller 20 uses arms 15 and the up-down moving mechanism for arms 15 (i.e., arm base elevating unit 12c) to cause robot 10 to stand up when robot 10 falls on the ground or floor, for example. First, arm base 14 is moved upward by the up-down moving mechanism, and arms 15 support the body of robot 10 ((a) and (b) in FIG.

6). By moving arm base 14 downward while simultaneously supporting the body of robot 10 with arms 15, the body is gradually angled up ((c) and (d) in FIG. 6), and finally, the body is angled upright (i.e., the body stands up; (e) in FIG. 6). For this reason, as described below, robot is heavy underfoot, such as under moving mechanism 11, whereby the center of gravity of robot 10 is close to the floor. Controller 20 does not necessarily need to perform all of the first, second, and third controls; it is sufficient if controller 20 performs at least one of the first, second, or third controls.

Next, specific operations performed by robot 10 according to the present embodiment configured as described above will be described.

Figure 3A:
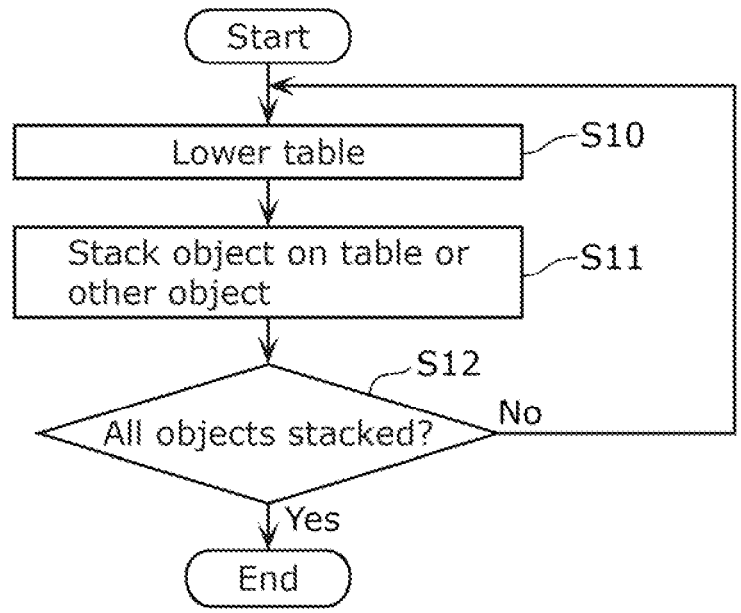
FIG. 3A is a flowchart illustrating one example of first control performed by a controller included in the robot according to an embodiment.

FIG. 3A is a flowchart illustrating one example of the first control performed by controller 20 of robot 10 according to the present embodiment. The example illustrated in FIG. 3A is an example of control performed in a task of stacking a plurality of box-shaped objects on table 13.

When controller 20 receives a stacking instruction from terminal device 30 via wireless communication unit 17, table elevating unit 12d is controlled by elevating controller 22 so as to lower table 13 by an amount equivalent to the height of the object to be stacked (S10). Next, controller 20 grips a box-shaped object placed on a desk beside it and places the object on table 13 by controlling arms 15 with arm controller 21 (S11). Controller 20 then determines whether all objects have been stacked or not (S12), and if it determines that not all objects have been stacked (No in S12), it repeats steps S10 and S11 described above to stack the next object on the object(s) placed on table 13.

In this way, robot 10 controls the gradual lowering of the height of table 13 when stacking a plurality of objects. This allows objects to be stacked without changing the height of arms 15, thereby reducing the time required for the stacking task. Note that step S10 and step S11 may be interchanged. Conversely, when moving a plurality of box-like objects stacked on table 13 to a desk beside it, the height of table 13 is gradually increased each time an object is moved from table 13 to the desk.

Figure 3B:
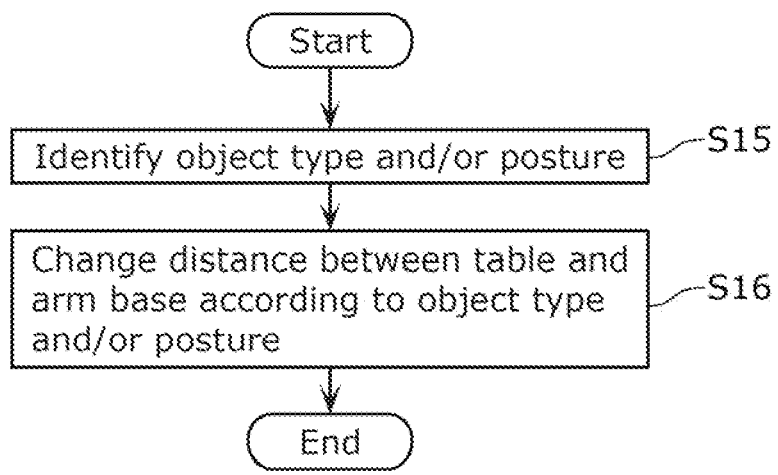
FIG. 3B is a flowchart illustrating another example of the first control performed by the controller included in the robot according to an embodiment.

FIG. 3B is a flowchart illustrating another example of the first control performed by controller 20 of robot 10 according to the present embodiment. The example illustrated in FIG. 3B is an example of control that changes the distance between the table and the arm base (distance in the height direction) depending on the object to be worked on in the task.

When controller 20 receives an instruction from terminal device to identify the type and/or posture of the object to be worked on in the task via wireless communication unit 17, or when the type and/or posture of the object to be worked on in the task is identified by sensor 16 (S15), controller 20 changes the distance between the table and the arm base in accordance with the type and/or posture of the object by controlling arm base elevating unit 12c and/or table elevating unit 12d using elevating controller 22 (S16). Note that the relationship between the type and/or posture of the object and the distance between the table and the arm base is registered in advance in an information table maintained by controller 20, for example. Therefore, by referring to this information table, controller 20 can identify the distance between the table and the arm base based on the type and/or posture of the object.

The size of an object typically depends on the type of object. Alternatively, the length in the height direction of the object depends on the object's posture. With the control example illustrated in FIG. 3B, the distance between the table and the arm base is appropriately adjusted in accordance with the type and/or posture of such an object.

Figure 3C:
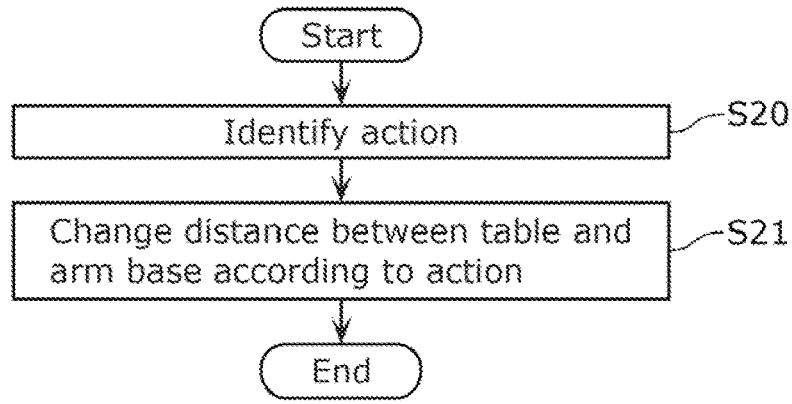
FIG. 3C is a flowchart illustrating yet another example of the first control performed by the controller included in the robot according to an embodiment.

FIG. 3C is a flowchart illustrating yet another example of the first control performed by controller 20 of robot 10 according to the present embodiment. The example illustrated in FIG. 3C is an example of control that changes the distance between the table and the arm base depending on the action to be performed by robot 10.

When controller 20 receives an instruction from terminal device via wireless communication unit 17 to identify the action to be performed by robot 10 or identifies the next action to be performed in a series of tasks (S20), controller 20 changes the distance between the table and the arm base by using elevating controller 22 to control arm base elevating unit 12c and/or table elevating unit 12d in accordance with the identified operation (S21). Note that the relationship between the action to be performed by robot 10 and the distance between the table and the arm base is registered in advance in an information table maintained by controller 20, for example. Therefore, by referring to this information table, controller 20 can identify the distance between the table and the arm base based on the next action to be performed.

The way arms 15 are moved typically changes depending on the action performed by robot 10, which in turn changes the size of the space required. With the control example illustrated in FIG. 3B, the distance between the table and the arm base is appropriately adjusted in accordance with the action to be performed by robot 10.

Figure 3D:
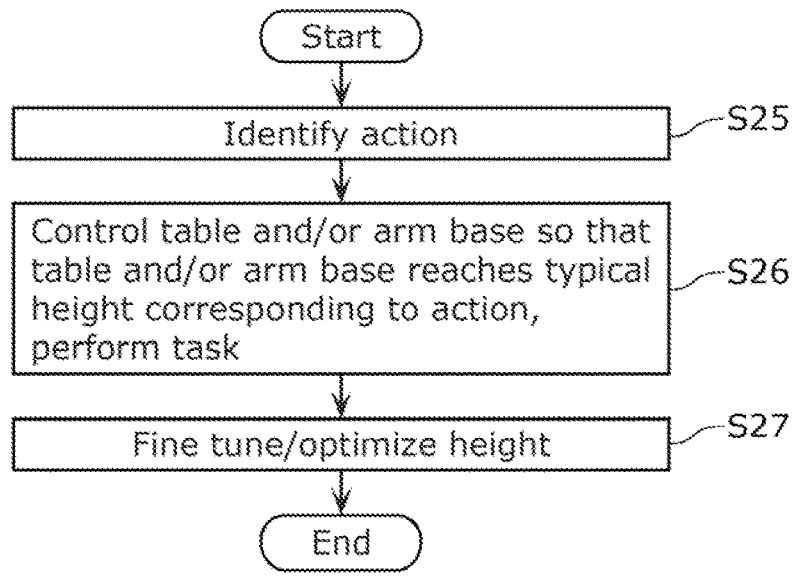
FIG. 3D is a flowchart illustrating yet another example of the first control performed by the controller included in the robot according to an embodiment.

FIG. 3D is a flowchart illustrating yet another example of the first control performed by controller 20 of robot 10 according to the present embodiment. The example illustrated in FIG. 3D is an example of control of adjusting the height of table 13 and arm base 14 in two stages.

When controller 20 receives an instruction from terminal device via wireless communication unit 17 to identify the action (task) to be performed by robot 10 or identifies the next action (task) to be performed in a series of tasks (S25), controller 20 first controls the height of table 13 and/or arm base 14 by using elevating controller 22 to control arm base elevating unit 12c and/or table elevating unit 12d such that table 13 and/or arm base 14 reach a typical height for performing the identified action (task) calculated based on a typical height of the task location at which the identified action (task) is to be performed, and then performs the identified action (task) (S26).

Controller 20 then measures the task location height using sensor 16 while the action (task) is being performed, and at a point in time after the measurement and after the height of table 13 and/or arm base 14 has been calculated, the height of table 13 and/or arm base 14 is fine tuned (i.e., optimized) to correspond to the measured task location (S27). Note that the relationship between the action to be performed by robot 10 and the height (typical height) of table 13 and/or arm base 14 that is controlled at the start of the action (task) is registered in advance in an information table maintained by controller 20, for example. Therefore, by referring to this information table, controller 20 can identify the height (typical height) of table 13 and/or arm base 14 that is controlled at the start of the action (task) based on the information on the next action (task) to be performed.

Thus, at the start of the task, the action (task) is first performed at the typical task location height for that action (task), which reduces the time required for the action (task) compared to a method where the height of the task location is calculated by sensor 16 before the action (task) is started and then the action (task) is started.

Figure 3E:
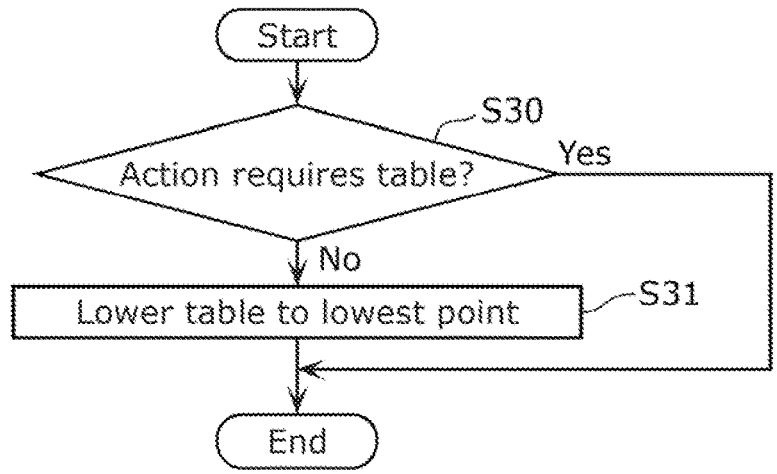
FIG. 3E is a flowchart illustrating yet another example of the first control performed by the controller included in the robot according to an embodiment.

FIG. 3E is a flowchart illustrating yet another example of the first control performed by controller 20 of robot 10 according to the present embodiment. The example illustrated in FIG. 3E is an example of control when robot 10 performs a task that does not require table 13.

When controller 20 receives an instruction from terminal device via wireless communication unit 17 to identify the action to be performed by robot 10 or identifies the next action to be performed in a series of tasks, controller 20 determines whether or not the action is an action requiring table 13 (S30). If controller 20 determines that the action does not require table 13 (No in S30), controller 20 uses elevating controller 22 to control table elevating unit 12d so as to lower table 13 to its lowest point (S31). With this, when the task to be performed by robot 10 is a task that does not require table 13 and the presence of table 13 would interfere with the task, table 13 can be lowered to its lowest point to avoid interfering with the task.

Figure 4:
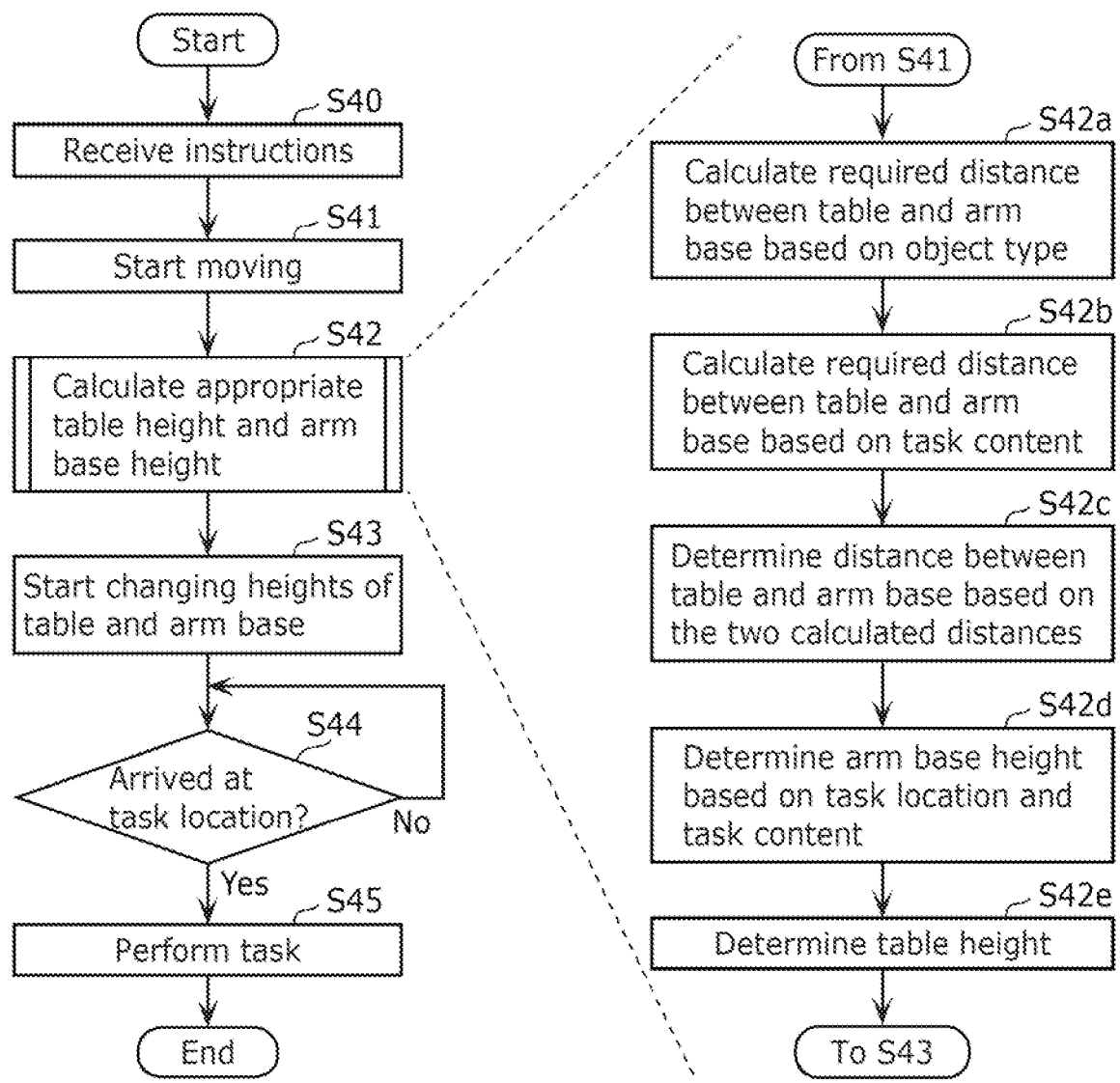
FIG. 4 is a flowchart illustrating one example of second control performed by the controller included in the robot according to an embodiment.

FIG. 4 is a flowchart illustrating one example of the second control performed by controller 20 of robot 10 according to the present embodiment. The example illustrated in FIG. 4 is an example of an action performed by robot 10 when it receives an instruction to move to a task location in order to perform a task.

When controller 20 receives, from terminal device 30 via wireless communication unit 17, instructions indicating the details of the task including the task location (S40), controller 20 controls moving mechanism 11 using moving mechanism controller 23 so as to start moving robot 10 to the task location (S41). Next, controller 20 calculates an appropriate height for table 13 and an appropriate height for arm base elevating unit 14 based on the height of the task location, the type (general shape) of object to be handled, the posture of the object to be handled, the number of objects to be handled, and task content, which are included in the received instructions (S42), and then, to achieve the calculated heights, controller 20 controls arm base elevating unit 12c and table elevating unit 12d using lifting and lowering controller 22 so as to start changing the heights of table 13 and arm base 14 (S43). Stated differently, the changing of the heights of table 13 and arm base 14 should be initiated after robot 10 starts moving to and before arriving at the task location. Controller uses sensor 16 to determine whether or not robot 10 has arrived at the task location (S44), and if controller 20 determines that robot 10 has arrived (Yes in S44), controller 20 controls arm controller 21, elevating mechanism controller 22, and moving mechanism controller 23 so as to perform the task at the task location (S45).

Next, one example of step S42 described above will be given. Controller 20 first calculates the required distance between the table and the arm base based on the type, posture, and number of objects to be worked on in the task, which are indicated in the received instructions (S42a). Controller 20 also identifies the size of the space in which arms 15 need to be moved based on the task content included in the received instructions, and calculates the required distance between the table and the arm base based on the distance in the height direction of the identified space (S42b). The larger of the two distances obtained in steps S42a and 42b described above is adopted as the distance between the table and the arm base (S42c). Furthermore, controller 20 determines the appropriate height of arms 15, that is, the height of arm base 14, based on the information on the task location (height and type) and the task content included in the received instructions (S42d). Lastly, controller 20 calculates the appropriate height for table 13 based on the height of arm base 14 determined in step S42d above and the distance between the table and the arm base determined in step S42c above (S42e). For this series of processes (steps S42a through S42e), controller 20 holds programs for calculating the height of arm base 14 and the height of table 13 for each type of task, separately from the control programs for the tasks and movement, and selects and executes the program corresponding to the type of task indicated in the received instructions. The calculation of the height of arm base 14 and the height of table 13 may be done differently for each action, irrespective of the above example.

With this second control, the changing of the height of table 13 and the height of arm base 14 is initiated after robot 10 starts moving to and before arriving at the task location, reducing the time required for tasks that involve moving robot 10.

Robot 10 according to the present embodiment includes: moving mechanism 11 capable of moving autonomously; elevating mechanism 12 including columnar members 12a and 12b erected on moving mechanism 11; table 13 which is elevated and lowered by elevating mechanism 12; arm base 14 which is provided above table 13 and is elevated and lowered by elevating mechanism 12; arms 15 which are attached to arm base 14, include a hand capable of accessing an object placed on table 13, and have a number of degrees of freedom that allow for the control of five or more or four or more of the following six variables of movement of the hand in a given three-dimensional space: X-axis translation, Z-axis translation, Y-axis translation, X-axis rotation, Y-axis rotation, and Z-axis rotation; sensors 16 which detect the state on table 13, including an object, and the surrounding area of robot 10; and controller 20 that controls moving mechanism 11, elevating mechanism 12, and arms 15 based on information obtained from an external source and a detection result of sensors 16. Circumscribed space 25 circumscribing robot 10 except for arms 15 is in a shape of a cuboid. Arms 15 have a structure capable of accessing the outside of circumscribed space 25. Length A of a first of two orthogonal sides of the bottom face is 110 cm or less. Length B of a second of the two orthogonal sides is 110 cm or less, independent of A. Height H of circumscribed space 25 is 1.5A or more.

With this configuration, since the bottom face of circumscribed space 25 of robot 10 according to the present embodiment is a quadrilateral defined by side A that is 110 cm or less and side B that is 110 cm or less, independent of A, robot 10 has a footprint that is approximately the same size as that of a person, which overcomes/satisfies the issue/requirement described in (1) above that robot 10 must have a footprint approximately equal to or less than that of a person.

Since robot 10 according to the present embodiment includes arms 15 having a number of degrees of freedom that allow for the control of five or more or four or more of the following six variables of movement of the hand in a given three-dimensional space: left-right translation (X-axis translation), vertical translation (Z-axis translation), front-back translation (Y-axis translation), X-axis rotation, Y-axis rotation, and Z-axis rotation, includes table 13 that can be elevated and lowered, and includes moving mechanism 11 capable of moving autonomously, the issue/requirement described in (2) above that robot 10 must be able to handle task-related objects is overcome/satisfied.

With robot 10 according to the present embodiment, since the moving parts (moving mechanism 11, elevating mechanism 12, and arms 15) are independent and can operate in parallel, the issue/requirement described in (3) above that tasks need to be completed in as little time as possible is overcome/satisfied.

With robot 10 according to the present embodiment, since arms have a structure capable of accessing the outside of circumscribed space 25, the issue/requirement described in (4) above that robot 10 must be able to perform a desired task in an area outside a circumscribed space that houses the robot body is overcome/satisfied.

Since robot 10 according to the present embodiment includes arms 15 and table 13 which are capable of being elevated and lowered, and arms 15 have a number of degrees of freedom that allow for the control of five or more or four or more of the following six variables of movement of the hand in a given three-dimensional space: X-axis translation, Z-axis translation, Y-axis translation, X-axis rotation, Y-axis rotation, and Z-axis rotation, and thus can handle a variety of tasks, the issue/requirement described in (5) above that various tasks need to be able to be performed by a single robot is overcome/satisfied. Note that arms 15 are not limited to the above number of degrees of freedom, and may be some other number of degrees of freedom so long as arms 15 can handle the various tasks to be performed.

Since robot 10 according to the present embodiment includes table 13 on which task-related objects can be placed and which is capable of being elevated and lowered, the issue/requirement described in (6) above that task-related objects need to be placed as close to the task location as possible is overcome/satisfied.

Since robot 10 according to the present embodiment includes table 13 capable of being elevated and lowered, and arms 15 that are capable of being elevated and lowered and capable of accessing an object placed on table 13, the issue/requirement described in (7) above that robot 10 needs to perform the same task at various heights is overcome/satisfied. Note that as long as one of the arm and the table complements the other and the task can be performed at different heights, the arm base and the table do not have to be elevated and lowered at the same time.

Since robot 10 according to the present embodiment includes moving mechanism 11 capable of moving autonomously and moving parts (moving mechanism 11, elevating mechanism 12, and arms 15) that are capable of operating in parallel and independent of moving mechanism 11, and since elevating mechanism 12 includes columnar members 12a and 12b, is resistant to swaying/shaking from movement, and is capable of elevating and lowering while moving, the issue/requirement described in (8) above that robot 10 must be able to move and perform a task quickly is overcome/satisfied. The columnar members do not have to be used in all elevating mechanisms, and they do not need to be columnar members if they are sufficiently resistant to swaying/shaking.

As the first control, controller 20 controls at least one of the relative height of arm base 14 with respect to table 13, the height of table 13, or the height of arm base 14, in accordance with at least one of the action to be performed by robot 10, the type of object to be handled in the action, the posture of the object to be handled in the action, or the number of objects to be handled in the action. This makes it possible to adjust the heights of arms 15 and table 13 according to the action to be performed by robot 10, the object to be worked on in the task, and the environment, whereby robot 10 can enter an environment in which people are active and take over various manual tasks.

As the second control, controller 20 starts changing the height of at least one of table 13 or arm base 14 after robot 10 starts moving to and before arriving at the task location, in accordance with at least one of the action performed by robot 10, the task location to which robot 10 is to move, the type of object to be handled by robot 10 at the task location, the posture of the object to be handled by robot 10 at the task location, or the number of objects to be handled by robot 10 at the task location. This shortens the amount of time required to perform the task compared to when these are performed in sequence, since the height adjustment of table 13 and arms 15 is performed in parallel with the movement of robot 10.

Arms 15 include two arms 15 (first arm 15a and second arm 15b) fixed to a side face or the bottom face of arm base 14, as if hanging down, and spaced apart by a predetermined distance. This makes it easier for robot 10 to take over a manual task because it includes two arms 15 (first arm 15a and second arm 15b) that hang down from arm base 14 and are spaced apart by a predetermined distance, just like a person.

Moving mechanism 11 and table 13 have a quadrilateral top view shape, and elevating mechanism 12 includes two columnar members 12a and 12b that extend in parallel and are fixed to moving mechanism 11 and table 13 at the first and second corners, respectively, which correspond to the same corner in top view. As a result, robot 10 as a whole has a cuboid structure including two columnar members 12a and 12b, and table 13 and arm base 14 are stably fixed by the two columnar members 12a and 12b.

[Variations]

The robot according to the present disclosure is not limited to the shapes and structures described in the above embodiment. Hereinafter, variations of the present embodiment will be described.

(1) Variations of Table 13

Table 13 may include a mechanism that folds under control of controller 20. By equipping robot 10 with table 13 including a folding mechanism when elevating mechanism 12 is slow and the benefit outweighs the cost, when table 13 gets in the way of the task, instead of lowering table 13 to its lowest point, table 13 can be folded and quickly moved out of the way.

Robot 10 may include a plurality of tables 13 that can be elevated and lowered. In such cases, arms 15 have a structure that enables access to objects placed on any of the plurality of tables 13. Sensor 16, such as a camera, is provided on the bottom face of each of the upper tables, i.e., the tables except the lowest table, to detect objects placed on the table below. With this structure, for example, by placing a first task-related object on the topmost (first) table and a second task-related object on the second table, many task-related objects can be kept close to robot 10. Another advantage is that by arms 15 performing the task with the top-most task-related object and the second-most task-related object in parallel, the task can be more efficiently implemented and the overall task time can be reduced compared to when those tasks are performed in sequence.

Table 13 may be composed of a plurality of divided partial tables. For example, table 13 is composed of two partial tables divided into left and right sections. These two partial tables are elevated and lowered independently by elevating mechanism 12. This allows robot to perform tasks at different heights on the left and right sides.

Table 13 may further have the following features. These have the advantage of facilitating the task and reducing errors in performing the task.

A feature that prevents objects placed on the table surface from moving on the table surface (for example, an object fixing component, a table surface with a high coefficient of friction to prevent slippage, etc.; this is particularly useful when performing a task that utilizes a robot arm and the table or when moving the robot).

A feature that allows objects placed on the table to move on the table surface but not fall off the table (for example, protruding edges, walls, lids, etc.; protruding edges are, for example, like those commonly found on trays; other shapes are also acceptable).

If a lid is included, a feature that allows for detection of the position and posture of objects even when the lid is on, such as the lid being transparent, a camera or sensor of some kind being on the inner side of the lid or being able to detect objects through the lid, and a feature that allows information on how the objects are lined up to be received. A feature whereby information about the sequence of objects is tied to the container containing the objects, so that the robot can know the sequence of objects and create a plan for the task without looking directly at the objects. A feature whereby objects can be known before opening the container containing the objects, and the sequence of overlapping objects located in the back can be known, which is difficult to detect with cameras or sensors.

A feature that changes the orientation of an object placed on the table surface by rotating the table surface. In particular, it is preferable to use this feature in conjunction with the aforementioned feature for preventing objects from moving.

A feature that changes the angle of the table surface.

A wiper mechanism that pushes objects placed on the table surface in one direction (for example, a low-height, protruding mechanism that slides over the table surface in one direction to push objects off).

(2) Prevention of Robot 10 from Tipping Over

Robot 10 may include a structure and mechanism that inhibits robot 10 from tipping due to the condition of the floor. As an example of a simple technique to achieve this, the center of gravity of moving mechanism 11 should be close to the floor. As an example of an advanced technique to achieve this, each wheel includes active suspension that changes the height of the wheel depending on the height of the floor at the position of each wheel in moving mechanism 11. As an example of an even more advanced technique to achieve this, an acceleration sensor that detects the tilt of robot 10 body is mounted on robot 10, and the position of the center of gravity is changed by changing the height of the active suspension on each wheel to cancel the detected tilt or by changing the position of a weighted object mounted inside robot 10.

(3) Robot Variation

Figure 5:
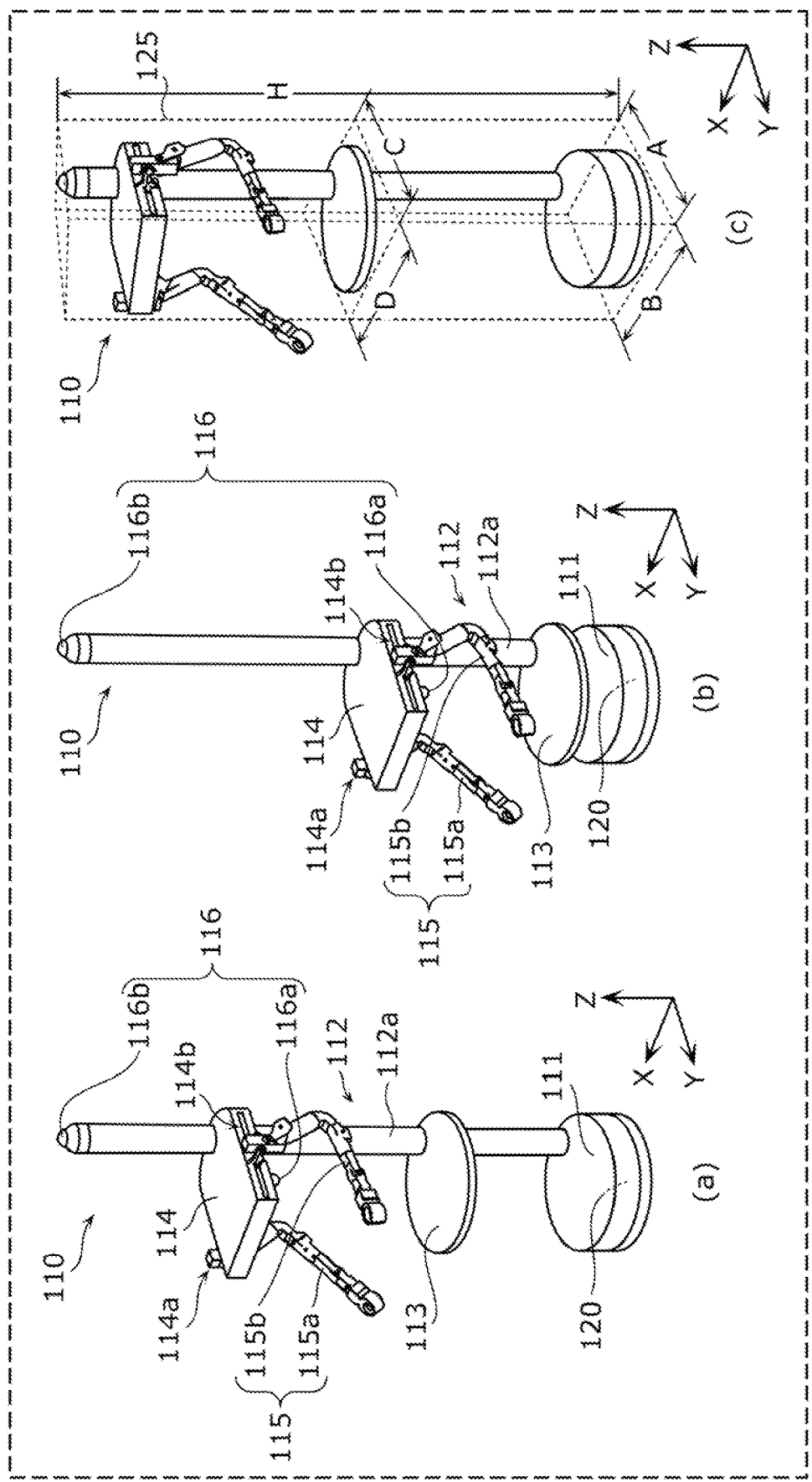
FIG. 5 is an external perspective view of a robot according to a variation of an embodiment.

FIG. 5 is an external perspective view of robot 110 according to a variation of the embodiment. FIG. 5 illustrates examples of table 113 and arm base 114 included in robot 110 at three different heights ((a) through (c) in FIG. 5). For convenience, the reference signs of the finer elements are illustrated in (a) and (b) in FIG. 5, and the reference signs of circumscribed space 125 and the dimensions thereof are illustrated in (c) in FIG. 5.

Like the above embodiment, robot 110 is a robot that enters an environment in which people are active and takes over a manual task, and includes: moving mechanism 111 capable of moving autonomously; elevating mechanism 112 including columnar member 112a fixed to and erected on moving mechanism 111; table 113 which is elevated and lowered by elevating mechanism 112 along columnar member 112a; arm base 114 which is provided above table 113 and is elevated and lowered by elevating mechanism 112 along columnar member 112a; arms 115 (first arm 115a and second arm 115b) which are attached to arm base 114, include a hand capable of accessing an object placed on table 113, and have a number of degrees of freedom that allow for the control of five or more of the following six variables of movement of the hand in a given three-dimensional space: left-right translation (X-axis translation), vertical translation (Z-axis translation), front-back translation (Y-axis translation), X-axis rotation, Y-axis rotation, and Z-axis rotation; sensors 116 (first camera 116a and second camera 116b) which detect the state on table 113, including an object, and the surrounding area of robot 110; and controller 120 that controls moving mechanism 111, elevating mechanism 112, and arms 115 based on information obtained from an external source and a detection result of sensors 116.

Robot 110 according to the present variation has basically the same structure and functions as the above embodiment, but differs from the above embodiment in regard to the overall shape as well as sliding mechanisms 114a and 114b included in arm base 114. The following will focus on the points of difference from the above embodiment.

Moving mechanism 111 has a top view shape of a 40 cm diameter circle. Stated differently, as a whole, moving mechanism 111 has a cylindrical shape.

Table 113 has a top view shape of a 40 cm diameter circle.

Elevating mechanism 112 includes a single metal cylindrical columnar member 112a erected on moving mechanism 111, which independently elevates and lowers table 113 and arm base 114 under the control of controller 120. The single columnar member 112a is fixed to moving mechanism 111 and table 113 in a manner that penetrates the circular edge of moving mechanism 111 and table 113 in top view. Note that table 113 and arm base 114 may be elevated and lowered along different columnar members rather than along a single columnar member, irrespective of the present variation. Instead of an elevating mechanism that moves up and down along rails, such as columnar member 112a and arm base 114, the elevating mechanism may be based on a structure in which the columnar member extends and retracts in the longitudinal direction and the arm base is provided at the leading end of the columnar member. Arm base 114 and table 113 may be moved by different elevating mechanisms.

Arm base 114 includes sliding mechanisms 114a and 114b on both sides in the left-right (X-axis) direction that respectively slide first arm 115a and second arm 115b in the front-back (Y-axis) direction. Sliding mechanisms 114a and 114b are belt-driven or stage-driven mechanisms that respectively slide the base of first arm 115a and second arm 115b in the front-back (Y-axis) direction using grooves on the side of arm base 114 as guides. This enables an object to be moved accurately by moving the leading end portions of first arm 115a and second arm 115b while maintaining the postures of first arm 115a and second arm 115b. In general, robot arms are not good at moving back and forth, depending on the direction in which the arms are attached, even when they have six degrees of freedom. Sliding mechanisms 114a and 114b according to the present variation allow for accurate back and forth movement of arms 115. For example, making the longitudinal posture of the forearm of arms 115 extend in the front-back direction (parallel to the Y-axis) and moving arms 115 forward (insertion) or backward (withdrawal) while maintaining the longitudinal posture corresponds to an action of moving an object through a narrow space to the back, and sliding mechanisms 114a and 114b according to the present variation make such an action possible.

As described above, with robot 110 according to the present variation, unlike the above embodiment, elevating mechanism 112 is composed of a single columnar member 112a, which reduces the number of obstacles that may interfere with a task to be performed on table 113, and ensures a large task space.

The above embodiment describes a practical robot that simultaneously overcomes and satisfies all of the above-mentioned issues and requirements of (1) through (8). However, the robot according to the present invention does not necessarily have to overcome and satisfy all of the issues and requirements of (1) through (8) simultaneously; it is sufficient if the robot overcomes and satisfies as many of the issues and requirements of (1) through (8) as possible. This is because even such a robot will demonstrate usefulness in regard to the issues and requirements it simultaneously overcomes and satisfies. Such embodiments will be described in detail hereinafter.

A robot according to one aspect of the present disclosure includes: a moving mechanism capable of moving autonomously; an elevating mechanism provided on the moving mechanism; a table which is elevated and lowered by the elevating mechanism; an arm base which is provided above the table and is elevated and lowered by the elevating mechanism; an arm which is attached to the arm base, includes a hand capable of accessing an object placed on the table, and has a number of degrees of freedom that allow for the control of five or more of the following six variables of movement of the hand in a given three-dimensional space: X-axis translation, Z-axis translation, Y-axis translation, X-axis rotation, Y-axis rotation, and Z-axis rotation; a sensor which detects the object and the surrounding area of the robot; and a controller that controls the moving mechanism, the elevating mechanism, and the arm based on information obtained from an external source and the detection result of the sensor. A circumscribed space circumscribing the robot except for the arm is in a shape of a cuboid having a bottom face that is a face of a quadrilateral that circumscribes, in a top view, a shape of the robot except for the arm. The arm has a structure capable of accessing an outside of the circumscribed space. Length A of a first of two orthogonal sides of the bottom face is 110 cm or less. Length B of the second of the two orthogonal sides is 110 cm or less, independent of A. Height H of the circumscribed space is 1.5A or more.

A robot according to another aspect of the present disclosure includes: a moving mechanism capable of moving autonomously; an elevating mechanism provided on the moving mechanism; a table which is elevated and lowered by the elevating mechanism; an arm base which is provided above the table and is elevated and lowered by the elevating mechanism; an arm which is attached to the arm base, includes a hand capable of accessing an object placed on the table, and has a number of degrees of freedom that allow for the control of four or more of the following six variables of movement of the hand in a given three-dimensional space: X-axis translation, Z-axis translation, Y-axis translation, X-axis rotation, Y-axis rotation, and Z-axis rotation; a sensor which detects the object and the surrounding area of the robot; and a controller that controls the moving mechanism, the elevating mechanism, and the arm based on information obtained from an external source and the detection result of the sensor. A circumscribed space circumscribing the robot except for the arm is in a shape of a cuboid having a bottom face that is a face of a quadrilateral that circumscribes, in a top view, a shape of the robot except for the arm. The arm has a structure capable of accessing an outside of the circumscribed space. Length A of a first of two orthogonal sides of the bottom face is 110 cm or less. Length B of the second of the two orthogonal sides is 110 cm or less, independent of A. Height H of the circumscribed space is 1.5A or more.

A robot according to another aspect of the present disclosure includes: a moving mechanism capable of moving autonomously; an elevating mechanism including a columnar member erected on the moving mechanism; a table provided above the moving mechanism; an arm base which is provided above the table and is elevated and lowered by the elevating mechanism; an arm which is attached to the arm base, includes a hand capable of accessing an object placed on the table, and has a number of degrees of freedom that allow for the control of five or more of the following six variables of movement of the hand in a given three-dimensional space: X-axis translation, Z-axis translation, Y-axis translation, X-axis rotation, Y-axis rotation, and Z-axis rotation; a sensor which detects the object and the surrounding area of the robot; and a controller that controls the moving mechanism, the elevating mechanism, and the arm based on information obtained from an external source and the detection result of the sensor. A circumscribed space circumscribing the robot except for the arm is in a shape of a cuboid having a bottom face that is a face of a quadrilateral that circumscribes, in a top view, a shape of the robot except for the arm. The arm has a structure capable of accessing an outside of the circumscribed space. Length A of a first of two orthogonal sides of the bottom face is 110 cm or less. Length B of the second of the two orthogonal sides is 110 cm or less, independent of A. Height H of the circumscribed space is 1.5A or more.

A robot according to another aspect of the present disclosure includes: a moving mechanism capable of moving autonomously; an elevating mechanism including a columnar member erected on the moving mechanism; a table provided above the moving mechanism; an arm base which is provided above the table and is elevated and lowered by the elevating mechanism; an arm which is attached to the arm base, includes a hand capable of accessing an object placed on the table, and has a number of degrees of freedom that allow for the control of four or more of the following six variables of movement of the hand in a given three-dimensional space: X-axis translation, Z-axis translation, Y-axis translation, X-axis rotation, Y-axis rotation, and Z-axis rotation; a sensor which detects the object and the surrounding area of the robot; and a controller that controls the moving mechanism, the elevating mechanism, and the arm based on information obtained from an external source and the detection result of the sensor. A circumscribed space circumscribing the robot except for the arm is in a shape of a cuboid having a bottom face that is a face of a quadrilateral that circumscribes, in a top view, a shape of the robot except for the arm. The arm has a structure capable of accessing an outside of the circumscribed space. Length A of a first of two orthogonal sides of the bottom face is 110 cm or less. Length B of the second of the two orthogonal sides is 110 cm or less, independent of A. Height H of the circumscribed space is 1.5A or more.

A robot according to another aspect of the present disclosure includes: a moving mechanism capable of moving autonomously; an elevating mechanism provided on the moving mechanism; a table provided above the moving mechanism; an arm base which is provided above the table and is elevated and lowered by the elevating mechanism; an arm which is attached to the arm base, includes a hand capable of accessing an object placed on the table, and has a number of degrees of freedom that allow for the control of five or more of the following six variables of movement of the hand in a given three-dimensional space: X-axis translation, Z-axis translation, Y-axis translation, X-axis rotation, Y-axis rotation, and Z-axis rotation; a sensor which detects the object and the surrounding area of the robot; and a controller that controls the moving mechanism, the elevating mechanism, and the arm based on information obtained from an external source and the detection result of the sensor. A circumscribed space circumscribing the robot except for the arm is in a shape of a cuboid having a bottom face that is a face of a quadrilateral that circumscribes, in a top view, a shape of the robot except for the arm. The arm has a structure capable of accessing an outside of the circumscribed space. Length A of a first of two orthogonal sides of the bottom face is 110 cm or less. Length B of the second of the two orthogonal sides is 110 cm or less, independent of A. Height H of the circumscribed space is 1.5A or more.

A robot according to another aspect of the present disclosure includes: a moving mechanism capable of moving autonomously; an elevating mechanism provided on the moving mechanism; a table provided above the moving mechanism; an arm base which is provided above the table and is elevated and lowered by the elevating mechanism; an arm which is attached to the arm base, includes a hand capable of accessing an object placed on the table, and has a number of degrees of freedom that allow for the control of four or more of the following six variables of movement of the hand in a given three-dimensional space: X-axis translation, Z-axis translation, Y-axis translation, X-axis rotation, Y-axis rotation, and Z-axis rotation; a sensor which detects the object and the surrounding area of the robot; and a controller that controls the moving mechanism, the elevating mechanism, and the arm based on information obtained from an external source and the detection result of the sensor. A circumscribed space circumscribing the robot except for the arm is in a shape of a cuboid having a bottom face that is a face of a quadrilateral that circumscribes, in a top view, a shape of the robot except for the arm. The arm has a structure capable of accessing an outside of the circumscribed space. Length A of a first of two orthogonal sides of the bottom face is 110 cm or less. Length B of the second of the two orthogonal sides is 110 cm or less, independent of A. Height H of the circumscribed space is 1.5A or more.

A robot according to another aspect of the present disclosure includes: a moving mechanism capable of moving autonomously; a first elevating mechanism provided on the moving mechanism; a table which is elevated and lowered by the first elevating mechanism; a second elevating mechanism including a columnar member erected on the moving mechanism; an arm base which is provided above the table and is elevated and lowered by the second elevating mechanism; an arm which is attached to the arm base, includes a hand capable of accessing an object placed on the table, and has a number of degrees of freedom that allow for the control of five or more of the following six variables of movement of the hand in a given three-dimensional space: X-axis translation, Z-axis translation, Y-axis translation, X-axis rotation, Y-axis rotation, and Z-axis rotation; a sensor which detects the object and the surrounding area of the robot; and a controller that controls the moving mechanism, the first elevating mechanism, the second elevating mechanism, and the arm based on information obtained from an external source and the detection result of the sensor. A circumscribed space circumscribing the robot except for the arm is in a shape of a cuboid having a bottom face that is a face of a quadrilateral that circumscribes, in a top view, a shape of the robot except for the arm. The arm has a structure capable of accessing an outside of the circumscribed space. Length A of a first of two orthogonal sides of the bottom face is 110 cm or less. Length B of the second of the two orthogonal sides is 110 cm or less, independent of A. Height H of the circumscribed space is 1.5A or more.

A robot according to another aspect of the present disclosure includes: a moving mechanism capable of moving autonomously; a first elevating mechanism provided on the moving mechanism; a table which is elevated and lowered by the first elevating mechanism; a second elevating mechanism including a columnar member erected on the moving mechanism; an arm base which is provided above the table and is elevated and lowered by the second elevating mechanism; an arm which is attached to the arm base, includes a hand capable of accessing an object placed on the table, and has a number of degrees of freedom that allow for the control of four or more of the following six variables of movement of the hand in a given three-dimensional space: X-axis translation, Z-axis translation, Y-axis translation, X-axis rotation, Y-axis rotation, and Z-axis rotation; a sensor which detects the object and the surrounding area of the robot; and a controller that controls the moving mechanism, the first elevating mechanism, the second elevating mechanism, and the arm based on information obtained from an external source and the detection result of the sensor. A circumscribed space circumscribing the robot except for the arm is in a shape of a cuboid having a bottom face that is a face of a quadrilateral that circumscribes, in a top view, a shape of the robot except for the arm. The arm has a structure capable of accessing an outside of the circumscribed space. Length A of a first of two orthogonal sides of the bottom face is 110 cm or less. Length B of the second of the two orthogonal sides is 110 cm or less, independent of A. Height H of the circumscribed space is 1.5A or more.

A robot according to another aspect of the present disclosure includes: a moving mechanism capable of moving autonomously; an elevating mechanism provided on the moving mechanism; a table that is elevated and lowered by the elevating mechanism; an arm base provided above the moving mechanism; an arm which is attached to the arm base, includes a hand capable of accessing an object placed on the table, and has a number of degrees of freedom that allow for the control of five or more of the following six variables of movement of the hand in a given three-dimensional space: X-axis translation, Z-axis translation, Y-axis translation, X-axis rotation, Y-axis rotation, and Z-axis rotation; a sensor which detects the object and the surrounding area of the robot; and a controller that controls the moving mechanism, the elevating mechanism, and the arm based on information obtained from an external source and the detection result of the sensor. A circumscribed space circumscribing the robot except for the arm is in a shape of a cuboid having a bottom face that is a face of a quadrilateral that circumscribes, in a top view, a shape of the robot except for the arm. The arm has a structure capable of accessing an outside of the circumscribed space. Length A of a first of two orthogonal sides of the bottom face is 110 cm or less. Length B of the second of the two orthogonal sides is 110 cm or less, independent of A. Height H of the circumscribed space is 1.5A or more.

A robot according to another aspect of the present disclosure includes: a moving mechanism capable of moving autonomously; an elevating mechanism provided on the moving mechanism; a table that is elevated and lowered by the elevating mechanism; an arm base provided above the moving mechanism; an arm which is attached to the arm base, includes a hand capable of accessing an object placed on the table, and has a number of degrees of freedom that allow for the control of four or more of the following six variables of movement of the hand in a given three-dimensional space: X-axis translation, Z-axis translation, Y-axis translation, X-axis rotation, Y-axis rotation, and Z-axis rotation; a sensor which detects the object and the surrounding area of the robot; and a controller that controls the moving mechanism, the elevating mechanism, and the arm based on information obtained from an external source and the detection result of the sensor. A circumscribed space circumscribing the robot except for the arm is in a shape of a cuboid having a bottom face that is a face of a quadrilateral that circumscribes, in a top view, a shape of the robot except for the arm. The arm has a structure capable of accessing an outside of the circumscribed space. Length A of a first of two orthogonal sides of the bottom face is 110 cm or less. Length B of the second of the two orthogonal sides is 110 cm or less, independent of A. Height H of the circumscribed space is 1.5A or more.

A robot according to another aspect of the present disclosure includes: a moving mechanism capable of moving autonomously; an elevating mechanism including a columnar member erected on the moving mechanism; a table that is elevated and lowered by the elevating mechanism; an arm base which is provided above the table and is elevated and lowered by the elevating mechanism; an arm which is attached to the arm base, includes a hand capable of accessing an object placed on the table, and has a number of degrees of freedom that allow for the control of four or more of the following six variables of movement of the hand in a given three-dimensional space: X-axis translation, Z-axis translation, Y-axis translation, X-axis rotation, Y-axis rotation, and Z-axis rotation; a sensor which detects the object and the surrounding area of the robot; and a controller that controls the moving mechanism, the elevating mechanism, and the arm based on information obtained from an external source and the detection result of the sensor. A circumscribed space circumscribing the robot except for the arm is in a shape of a cuboid having a bottom face that is a face of a quadrilateral that circumscribes, in a top view, a shape of the robot except for the arm. The arm has a structure capable of accessing an outside of the circumscribed space. Length A of a first of two orthogonal sides of the bottom face is 110 cm or less. Length B of the second of the two orthogonal sides is 110 cm or less, independent of A. Height H of the circumscribed space is 1.5A or more.

A robot according to another aspect of the present disclosure includes: a moving mechanism capable of moving autonomously; an elevating mechanism including a columnar member erected on the moving mechanism; a table that is elevated and lowered by the elevating mechanism; an arm base which is provided above the table and is elevated and lowered by the elevating mechanism; an arm which is attached to the arm base, includes a hand capable of accessing an object placed on the table, and has a number of degrees of freedom that allow for the control of five or more of the following six variables of movement of the hand in a given three-dimensional space: X-axis translation, Z-axis translation, Y-axis translation, X-axis rotation, Y-axis rotation, and Z-axis rotation; a sensor which detects the object and the surrounding area of the robot; and a controller that controls the moving mechanism, the elevating mechanism, and the arm based on information obtained from an external source and the detection result of the sensor. A circumscribed space circumscribing the robot except for the arm is in a shape of a cuboid having a bottom face that is a face of a quadrilateral that circumscribes, in a top view, a shape of the robot except for the arm. The arm has a structure capable of accessing an outside of the circumscribed space. Length A of a first of two orthogonal sides of the bottom face is 110 cm or less. Length B of the second of the two orthogonal sides is 110 cm or less, independent of A. Height H of the circumscribed space is 1.4 A or more.

A robot according to another aspect of the present disclosure includes: a moving mechanism capable of moving autonomously; an elevating mechanism provided on the moving mechanism; a table which is elevated and lowered by the elevating mechanism; an arm base which is provided above the table and is elevated and lowered by the elevating mechanism; an arm which is attached to the arm base, includes a hand capable of accessing an object placed on the table, and has a number of degrees of freedom that allow for the control of three or more of the following six variables of movement of the hand in a given three-dimensional space: X-axis translation, Z-axis translation, Y-axis translation, X-axis rotation, Y-axis rotation, and Z-axis rotation; a sensor which detects the object and the surrounding area of the robot; and a controller that controls the moving mechanism, the elevating mechanism, and the arm based on information obtained from an external source and the detection result of the sensor. A circumscribed space circumscribing the robot except for the arm is in a shape of a cuboid having a bottom face that is a face of a quadrilateral that circumscribes, in a top view, a shape of the robot except for the arm. The arm has a structure capable of accessing an outside of the circumscribed space. Length A of a first of two orthogonal sides of the bottom face is 110 cm or less. Length B of the second of the two orthogonal sides is 110 cm or less, independent of A. Height H of the circumscribed space is 1.5A or more.

A robot according to another aspect of the present disclosure includes: a moving mechanism capable of moving autonomously; an elevating mechanism including a columnar member erected on the moving mechanism; a table provided above the moving mechanism; an arm base which is provided above the table and is elevated and lowered by the elevating mechanism; an arm which is attached to the arm base, includes a hand capable of accessing an object placed on the table, and has a number of degrees of freedom that allow for the control of three or more of the following six variables of movement of the hand in a given three-dimensional space: X-axis translation, Z-axis translation, Y-axis translation, X-axis rotation, Y-axis rotation, and Z-axis rotation; a sensor which detects the object and the surrounding area of the robot; and a controller that controls the moving mechanism, the elevating mechanism, and the arm based on information obtained from an external source and the detection result of the sensor. A circumscribed space circumscribing the robot except for the arm is in a shape of a cuboid having a bottom face that is a face of a quadrilateral that circumscribes, in a top view, a shape of the robot except for the arm. The arm has a structure capable of accessing an outside of the circumscribed space. Length A of a first of two orthogonal sides of the bottom face is 110 cm or less. Length B of the second of the two orthogonal sides is 110 cm or less, independent of A. Height H of the circumscribed space is 1.5A or more.

A robot according to another aspect of the present disclosure includes: a moving mechanism capable of moving autonomously; an elevating mechanism provided on the moving mechanism; a table provided above the moving mechanism; an arm base which is provided above the table and is elevated and lowered by the elevating mechanism; an arm which is attached to the arm base, includes a hand capable of accessing an object placed on the table, and has a number of degrees of freedom that allow for the control of three or more of the following six variables of movement of the hand in a given three-dimensional space: X-axis translation, Z-axis translation, Y-axis translation, X-axis rotation, Y-axis rotation, and Z-axis rotation; a sensor which detects the object and the surrounding area of the robot; and a controller that controls the moving mechanism, the elevating mechanism, and the arm based on information obtained from an external source and the detection result of the sensor. A circumscribed space circumscribing the robot except for the arm is in a shape of a cuboid having a bottom face that is a face of a quadrilateral that circumscribes, in a top view, a shape of the robot except for the arm. The arm has a structure capable of accessing an outside of the circumscribed space. Length A of a first of two orthogonal sides of the bottom face is 110 cm or less. Length B of the second of the two orthogonal sides is 110 cm or less, independent of A. Height H of the circumscribed space is 1.5A or more.

A robot according to another aspect of the present disclosure includes: a moving mechanism capable of moving autonomously; a first elevating mechanism provided on the moving mechanism; a table which is elevated and lowered by the first elevating mechanism; a second elevating mechanism including a columnar member erected on the moving mechanism; an arm base which is provided above the table and is elevated and lowered by the second elevating mechanism; an arm which is attached to the arm base, includes a hand capable of accessing an object placed on the table, and has a number of degrees of freedom that allow for the control of three or more of the following six variables of movement of the hand in a given three-dimensional space: X-axis translation, Z-axis translation, Y-axis translation, X-axis rotation, Y-axis rotation, and Z-axis rotation; a sensor which detects the object and the surrounding area of the robot; and a controller that controls the moving mechanism, the first elevating mechanism, the second elevating mechanism, and the arm based on information obtained from an external source and the detection result of the sensor. A circumscribed space circumscribing the robot except for the arm is in a shape of a cuboid having a bottom face that is a face of a quadrilateral that circumscribes, in a top view, a shape of the robot except for the arm. The arm has a structure capable of accessing an outside of the circumscribed space. Length A of a first of two orthogonal sides of the bottom face is 110 cm or less. Length B of the second of the two orthogonal sides is 110 cm or less, independent of A. Height H of the circumscribed space is 1.5A or more.

A robot according to another aspect of the present disclosure includes: a moving mechanism capable of moving autonomously; an elevating mechanism provided on the moving mechanism; a table that is elevated and lowered by the elevating mechanism; an arm base provided above the moving mechanism; an arm which is attached to the arm base, includes a hand capable of accessing an object placed on the table, and has a number of degrees of freedom that allow for the control of three or more of the following six variables of movement of the hand in a given three-dimensional space: X-axis translation, Z-axis translation, Y-axis translation, X-axis rotation, Y-axis rotation, and Z-axis rotation; a sensor which detects the object and the surrounding area of the robot; and a controller that controls the moving mechanism, the elevating mechanism, and the arm based on information obtained from an external source and the detection result of the sensor. A circumscribed space circumscribing the robot except for the arm is in a shape of a cuboid having a bottom face that is a face of a quadrilateral that circumscribes, in a top view, a shape of the robot except for the arm. The arm has a structure capable of accessing an outside of the circumscribed space. Length A of a first of two orthogonal sides of the bottom face is 110 cm or less. Length B of the second of the two orthogonal sides is 110 cm or less, independent of A. Height H of the circumscribed space is 1.5A or more.

A robot according to another aspect of the present disclosure includes: a moving mechanism capable of moving autonomously; an elevating mechanism including a columnar member erected on the moving mechanism; a table that is elevated and lowered by the elevating mechanism; an arm base which is provided above the table and is elevated and lowered by the elevating mechanism; an arm which is attached to the arm base, includes a hand capable of accessing an object placed on the table, and has a number of degrees of freedom that allow for the control of three or more of the following six variables of movement of the hand in a given three-dimensional space: X-axis translation, Z-axis translation, Y-axis translation, X-axis rotation, Y-axis rotation, and Z-axis rotation; a sensor which detects the object and the surrounding area of the robot; and a controller that controls the moving mechanism, the elevating mechanism, and the arm based on information obtained from an external source and the detection result of the sensor. A circumscribed space circumscribing the robot except for the arm is in a shape of a cuboid having a bottom face that is a face of a quadrilateral that circumscribes, in a top view, a shape of the robot except for the arm. The arm has a structure capable of accessing an outside of the circumscribed space. Length A of a first of two orthogonal sides of the bottom face is 110 cm or less. Length B of the second of the two orthogonal sides is 110 cm or less, independent of A. Height H of the circumscribed space is 1.5A or more.

A robot according to another aspect of the present disclosure includes: a moving mechanism capable of moving autonomously; an elevating mechanism provided on the moving mechanism; a table which is elevated and lowered by the elevating mechanism; an arm base which is provided above the table and is elevated and lowered by the elevating mechanism; an arm which is attached to the arm base and includes a hand capable of accessing an object placed on the table; a sensor which detects the object and the surrounding area of the robot; and a controller that controls the moving mechanism, the elevating mechanism, and the arm based on information obtained from an external source and the detection result of the sensor. A circumscribed space circumscribing the robot except for the arm is in a shape of a cuboid having a bottom face that is a face of a quadrilateral that circumscribes, in a top view, a shape of the robot except for the arm. The arm has a structure capable of accessing an outside of the circumscribed space. Length A of a first of two orthogonal sides of the bottom face is 110 cm or less. Length B of the second of the two orthogonal sides is 110 cm or less, independent of A. Height H of the circumscribed space is 1.5A or more.

A robot according to another aspect of the present disclosure includes: a moving mechanism capable of moving autonomously; an elevating mechanism including a columnar member erected on the moving mechanism; a table provided above the moving mechanism; an arm base which is provided above the table and is elevated and lowered by the elevating mechanism; an arm which is attached to the arm base and includes a hand capable of accessing an object placed on the table; a sensor which detects the object and the surrounding area of the robot; and a controller that controls the moving mechanism, the elevating mechanism, and the arm based on information obtained from an external source and the detection result of the sensor. A circumscribed space circumscribing the robot except for the arm is in a shape of a cuboid having a bottom face that is a face of a quadrilateral that circumscribes, in a top view, a shape of the robot except for the arm. The arm has a structure capable of accessing an outside of the circumscribed space. Length A of a first of two orthogonal sides of the bottom face is 110 cm or less. Length B of the second of the two orthogonal sides is 110 cm or less, independent of A. Height H of the circumscribed space is 1.5A or more.

A robot according to another aspect of the present disclosure includes: a moving mechanism capable of moving autonomously; an elevating mechanism provided on the moving mechanism; a table provided above the moving mechanism; an arm base which is provided above the table and is elevated and lowered by the elevating mechanism; an arm which is attached to the arm base and includes a hand capable of accessing an object placed on the table; a sensor which detects the object and the surrounding area of the robot; and a controller that controls the moving mechanism, the elevating mechanism, and the arm based on information obtained from an external source and the detection result of the sensor. A circumscribed space circumscribing the robot except for the arm is in a shape of a cuboid having a bottom face that is a face of a quadrilateral that circumscribes, in a top view, a shape of the robot except for the arm. The arm has a structure capable of accessing an outside of the circumscribed space. Length A of a first of two orthogonal sides of the bottom face is 110 cm or less. Length B of the second of the two orthogonal sides is 110 cm or less, independent of A. Height H of the circumscribed space is 1.5A or more.

A robot according to another aspect of the present disclosure includes: a moving mechanism capable of moving autonomously; a first elevating mechanism provided on the moving mechanism; a table which is elevated and lowered by the first elevating mechanism; a second elevating mechanism including a columnar member erected on the moving mechanism; an arm base which is provided above the table and is elevated and lowered by the second elevating mechanism; an arm which is attached to the arm base and includes a hand capable of accessing an object placed on the table; a sensor which detects the object and the surrounding area of the robot; and a controller that controls the moving mechanism, the first elevating mechanism, the second elevating mechanism, and the arm based on information obtained from an external source and the detection result of the sensor. A circumscribed space circumscribing the robot except for the arm is in a shape of a cuboid having a bottom face that is a face of a quadrilateral that circumscribes, in a top view, a shape of the robot except for the arm. The arm has a structure capable of accessing an outside of the circumscribed space. Length A of a first of two orthogonal sides of the bottom face is 110 cm or less. Length B of the second of the two orthogonal sides is 110 cm or less, independent of A. Height H of the circumscribed space is 1.5A or more.

A robot according to another aspect of the present disclosure includes: a moving mechanism capable of moving autonomously; an elevating mechanism provided on the moving mechanism; a table which is elevated and lowered by the elevating mechanism; an arm base which is provided above the moving mechanism; an arm which is attached to the arm base and includes a hand capable of accessing an object placed on the table; a sensor which detects the object and the surrounding area of the robot; and a controller that controls the moving mechanism, the elevating mechanism, and the arm based on information obtained from an external source and the detection result of the sensor. A circumscribed space circumscribing the robot except for the arm is in a shape of a cuboid having a bottom face that is a face of a quadrilateral that circumscribes, in a top view, a shape of the robot except for the arm. The arm has a structure capable of accessing an outside of the circumscribed space. Length A of a first of two orthogonal sides of the bottom face is 110 cm or less. Length B of the second of the two orthogonal sides is 110 cm or less, independent of A. Height H of the circumscribed space is 1.5A or more.

A robot according to another aspect of the present disclosure includes: a moving mechanism capable of moving autonomously; an elevating mechanism including a columnar member erected on the moving mechanism; a table which is elevated and lowered by the elevating mechanism; an arm base which is provided above the table and is elevated and lowered by the elevating mechanism; an arm which is attached to the arm base and includes a hand capable of accessing an object placed on the table; a sensor which detects the object and the surrounding area of the robot; and a controller that controls the moving mechanism, the elevating mechanism, and the arm based on information obtained from an external source and the detection result of the sensor. A circumscribed space circumscribing the robot except for the arm is in a shape of a cuboid having a bottom face that is a face of a quadrilateral that circumscribes, in a top view, a shape of the robot except for the arm. The arm has a structure capable of accessing an outside of the circumscribed space. Length A of a first of two orthogonal sides of the bottom face is 110 cm or less. Length B of the second of the two orthogonal sides is 110 cm or less, independent of A. Height H of the circumscribed space is 1.5A or more.

A robot according to another aspect of the present disclosure includes: a moving mechanism capable of moving autonomously; a first elevating mechanism including a columnar member erected on the moving mechanism; a table that is elevated and lowered by the first elevating mechanism; a second elevating mechanism provided on the moving mechanism; an arm base which is provided above the table and is elevated and lowered by the second elevating mechanism; an arm which is attached to the arm base, includes a hand capable of accessing an object placed on the table, and has a number of degrees of freedom that allow for the control of five or more of the following six variables of movement of the hand in a given three-dimensional space: X-axis translation, Z-axis translation, Y-axis translation, X-axis rotation, Y-axis rotation, and Z-axis rotation; a sensor which detects the object and the surrounding area of the robot; and a controller that controls the moving mechanism, the first elevating mechanism, the second elevating mechanism, and the arm based on information obtained from an external source and the detection result of the sensor. A circumscribed space circumscribing the robot except for the arm is in a shape of a cuboid having a bottom face that is a face of a quadrilateral that circumscribes, in a top view, a shape of the robot except for the arm. The arm has a structure capable of accessing an outside of the circumscribed space. Length A of a first of two orthogonal sides of the bottom face is 110 cm or less. Length B of the second of the two orthogonal sides is 110 cm or less, independent of A. Height H of the circumscribed space is 1.5A or more.

A robot according to another aspect of the present disclosure includes: a moving mechanism capable of moving autonomously; a first elevating mechanism including a columnar member erected on the moving mechanism; a table that is elevated and lowered by the first elevating mechanism; a second elevating mechanism provided on the moving mechanism; an arm base which is provided above the table and is elevated and lowered by the second elevating mechanism; an arm which is attached to the arm base, includes a hand capable of accessing an object placed on the table, and has a number of degrees of freedom that allow for the control of four or more of the following six variables of movement of the hand in a given three-dimensional space: X-axis translation, Z-axis translation, Y-axis translation, X-axis rotation, Y-axis rotation, and Z-axis rotation; a sensor which detects the object and the surrounding area of the robot; and a controller that controls the moving mechanism, the first elevating mechanism, the second elevating mechanism, and the arm based on information obtained from an external source and the detection result of the sensor. A circumscribed space circumscribing the robot except for the arm is in a shape of a cuboid having a bottom face that is a face of a quadrilateral that circumscribes, in a top view, a shape of the robot except for the arm. The arm has a structure capable of accessing an outside of the circumscribed space. Length A of a first of two orthogonal sides of the bottom face is 110 cm or less. Length B of the second of the two orthogonal sides is 110 cm or less, independent of A. Height H of the circumscribed space is 1.5A or more.

A robot according to another aspect of the present disclosure includes: a moving mechanism capable of moving autonomously; a first elevating mechanism including a columnar member erected on the moving mechanism; a table that is elevated and lowered by the first elevating mechanism; a second elevating mechanism provided on the moving mechanism; an arm base which is provided above the table and is elevated and lowered by the second elevating mechanism; an arm which is attached to the arm base, includes a hand capable of accessing an object placed on the table, and has a number of degrees of freedom that allow for the control of three or more of the following six variables of movement of the hand in a given three-dimensional space: X-axis translation, Z-axis translation, Y-axis translation, X-axis rotation, Y-axis rotation, and Z-axis rotation; a sensor which detects the object and the surrounding area of the robot; and a controller that controls the moving mechanism, the first elevating mechanism, the second elevating mechanism, and the arm based on information obtained from an external source and the detection result of the sensor. A circumscribed space circumscribing the robot except for the arm is in a shape of a cuboid having a bottom face that is a face of a quadrilateral that circumscribes, in a top view, a shape of the robot except for the arm. The arm has a structure capable of accessing an outside of the circumscribed space. Length A of a first of two orthogonal sides of the bottom face is 110 cm or less. Length B of the second of the two orthogonal sides is 110 cm or less, independent of A. Height H of the circumscribed space is 1.5A or more.

A robot according to another aspect of the present disclosure includes: a moving mechanism capable of moving autonomously; a first elevating mechanism including a columnar member erected on the moving mechanism; a table which is elevated and lowered by the first elevating mechanism; a second elevating mechanism provided on the moving mechanism; an arm base which is provided above the table and is elevated and lowered by the second elevating mechanism; an arm which is attached to the arm base and includes a hand capable of accessing an object placed on the table; a sensor which detects the object and the surrounding area of the robot; and a controller that controls the moving mechanism, the first elevating mechanism, the second elevating mechanism, and the arm based on information obtained from an external source and the detection result of the sensor. A circumscribed space circumscribing the robot except for the arm is in a shape of a cuboid having a bottom face that is a face of a quadrilateral that circumscribes, in a top view, a shape of the robot except for the arm. The arm has a structure capable of accessing an outside of the circumscribed space. Length A of a first of two orthogonal sides of the bottom face is 110 cm or less. Length B of the second of the two orthogonal sides is 110 cm or less, independent of A. Height H of the circumscribed space is 1.5A or more.

Although the robot according to the present disclosure has been described based on an embodiment and variations thereof, the present disclosure is not limited to this embodiment and these variations. Embodiments arrived at by a person of skill in the art making various modifications to the embodiment and the variations as well as embodiments realized by arbitrarily combining elements in the embodiment and the variations which do not depart from the essence of the present disclosure are included in the present disclosure.

INDUSTRIAL APPLICABILITY

The robot according to the present disclosure can be used as a robot capable of entering an environment in which people are active and taking over a manual task.

REFERENCE SIGNS LIST 10, 110 robot
11, 111 moving mechanism
12, 112 elevating mechanism
12a, 12b, 112a columnar member
12c arm base elevating unit
12d table elevating unit
13, 113 table
14, 114 arm base
15, 115 arm
15a, 115a first arm
15b, 115b second arm
16, 116 sensor
16a, 116a first camera
16b, 116b second camera
16c various sensors
17 wireless communication unit
20, 120 controller
21 arm controller
22 elevating controller
23 moving mechanism controller
25, 125 circumscribed space
30 terminal device

The invention claimed is:
1. A robot comprising:
a moving mechanism which is capable of moving autonomously;

an elevating mechanism including a columnar member erected on the moving mechanism;

a table which is configured to be elevated and lowered by the elevating mechanism;

an arm base which is positioned above the table and configured to be elevated and lowered by the elevating mechanism;

an arm which is attached to the arm base and includes a hand capable of accessing an object on the table;

a sensor which is configured to detect the object and a surrounding area of the robot; and a controller which is configured to control the moving mechanism, the elevating mechanism, and the arm based on information from an external source and a detection result of the sensor, wherein:

a circumscribed space circumscribing at least the robot except for the arm is in a shape of a cuboid having a bottom face that is a face of a quadrilateral that circumscribes, in a top view, a shape of the robot except for the arm;

the arm has a structure capable of accessing an outside of the circumscribed space;

a length A of a first of two orthogonal sides of the bottom face is 110 cm or less, and a length B of a second of the two orthogonal sides is 110 cm or less, independent of A; and a height H of the circumscribed space is 1.5A or more.

2. The robot according to claim 1, wherein the table has a top face that is configured to increase a coefficient of friction.

3. The robot according to claim 1, wherein the table includes a protrusion at an edge of the table.

4. The robot according to claim 1, wherein the table includes a wall at an edge of the table.

* * * * *